US005917307A

United States Patent [19]

Watanabe et al.

[11] Patent Number: 5,917,307

[45] Date of Patent: Jun. 29, 1999

[54] MAGNETIC COUPLING DEVICE FOR CHARGING AN ELECTRIC VEHICLE

[75] Inventors: Kunihiko Watanabe; Heiji Kuki, both of Yokkaichi; Shuji Arisaka; Toshiro Shimada, both of Osaka, all of Japan

[73] Assignees: Sumitomo Wiring Systems, Ltd., Yokkaichi; Sumitomo Electric Industries, Ltd., Osaka, both of Japan

[21] Appl. No.: 08/911,355

[22] Filed: Aug. 7, 1997

[30] Foreign Application Priority Data

| | | | |
|---|---|---|---|
| Aug. 7, 1996 | [JP] | Japan | 8-208600 |
| Mar. 21, 1997 | [JP] | Japan | 9-068080 |
| Apr. 16, 1997 | [JP] | Japan | 9-099220 |
| Apr. 16, 1997 | [JP] | Japan | 9-099223 |
| Apr. 16, 1997 | [JP] | Japan | 9-099225 |
| May 13, 1997 | [JP] | Japan | 9-122501 |

[51] Int. Cl.[6] .......... H01M 10/46

[52] U.S. Cl. .......... 320/108

[58] Field of Search .......... 320/103, 104, 320/108, 109, FOR 101, DIG. 33, DIG. 34; 336/DIG. 2

[56] References Cited

U.S. PATENT DOCUMENTS

| | | | |
|---|---|---|---|
| 3,995,209 | 11/1976 | Weston . | |
| 5,192,832 | 3/1993 | Rudy, Jr. et al. . | |
| 5,216,402 | 6/1993 | Carosa . | |
| 5,229,652 | 7/1993 | Hough . | |
| 5,327,065 | 7/1994 | Bruni et al. | 320/108 |
| 5,434,493 | 7/1995 | Woody et al. | 320/108 |
| 5,536,979 | 7/1996 | McEachern et al. . | |
| 5,646,500 | 7/1997 | Wilson | 320/108 |
| 5,654,621 | 8/1997 | Seelig | 320/108 |
| 5,680,028 | 10/1997 | McEachern | 320/108 |

FOREIGN PATENT DOCUMENTS

| | | |
|---|---|---|
| 0 651 404 A1 | 5/1995 | European Pat. Off. . |
| 24 34 890 B1 | 11/1975 | Germany . |
| A-5-260671 | 10/1993 | Japan . |
| A-6-14470 | 1/1994 | Japan . |
| 2 058 474 | 4/1981 | United Kingdom . |

*Primary Examiner*—Edward H. Tso
*Attorney, Agent, or Firm*—Oliff & Berridge, PLC

[57] ABSTRACT

In a magnetic coupling device for charging an electric vehicle which is used for charging a power storage device of the electric vehicle by means of a charging power source, a primary coil unit is inserted into a receiving unit which is on an electric vehicle and in which a secondary coil unit is disposed. In the device, junction faces of primary and secondary cores are formed in the insertion direction of the primary coil unit, and primary and secondary coils are disposed at positions where, when the primary coil unit 30 is inserted, the primary and secondary coils do not interfere with each other. Wiping members which wipe the junction faces are disposed. The insertion direction of the primary coil unit is in parallel with the longitudinal direction of the unit.

9 Claims, 29 Drawing Sheets

MAGNETIC COUPLING DEVICE FOR CHARGING AN ELECTRIC VEHICLE

BACKGROUND OF THE INVENTION

1. Field of the Invention

The invention relates to a magnetic coupling device for charging an electric vehicle which is used for charging an electric vehicle by using electromagnetic induction.

2. Description of the Related Art

Recently, as a charging system for an electric vehicle, a system of the noncontact type which uses electromagnetic induction has been developed. An example of such a system is disclosed in Japanese Patent Unexamined Publication (Kokai) No. HEI6-14470. As shown in FIG. 36, the disclosed system includes a primary coil unit 1 connected to a charging power source, and a secondary coil unit 2 disposed on the body of an electric vehicle. When the vehicle is to be charged, the primary coil unit 1 is inserted into the vehicle body, thereby joining primary and secondary cores 3 and 4 together so as to constitute a magnetic circuit. Under this state, an AC current is supplied to a primary coil 5, so that an electromotive force is generated in a noncontact manner in a secondary coil 6.

However, the above-described structure is of a so-called junction face opposing type and has the following problems. During the process of inserting the primary coil unit 1, the junction faces of the primary and secondary cores 3 and 4 oppose each other and are then made close together. Therefore, a possible very small error of the insertion depth of the primary coil unit 1 directly affects the gap between the cores 3 and 4. The size of a gap in a magnetic circuit has a large effect on a magnetic resistance. Even if the insertion depth is slightly smaller than a preset value, therefore, the properties of the magnetic circuit are largely changed. For example, leakage fluxes are largely increased.

In such a structure, the junction faces of the core 3 of the primary coil unit 1 are exposed, and hence the faces are easily contaminated, so that the gap of the junction in the magnetic circuit is widened. This produces a problem in that it is cumbersome to clean the junction faces.

In the structure of the prior art, since the primary and secondary units which are flat oppose each other, the projected area of each unit in the insertion direction is large. In order to dispose the secondary coil unit, therefore, a region of a large area must be prepared in the outer face of the electric vehicle. This imposes severe restrictions on the design of the structure and appearance of the electric vehicle.

In addition, if a gap is formed in a portion where the primary and secondary cores are joined to each other, the loss is increased and the efficiency is lowered. In the state where the primary coil unit is inserted into the electric vehicle, therefore, it is preferable to join the primary and secondary cores to each other without forming a gap as far as possible.

SUMMARY OF THE INVENTION

The invention has been conducted in view of the above-mentioned circumstances. It is an object of the invention to provide a magnetic coupling device for charging an electric vehicle in which a gap of a junction in a magnetic circuit is not varied depending on the insertion state of a primary coil unit, thereby preventing properties of the magnetic circuit from being affected by the insertion state.

It is an another object of the invention to prevent a gap of a junction in a magnetic circuit from being widened by contamination of junction faces of primary and secondary cores.

It is a further object of the invention to reduce a projected area in the insertion direction of a primary coil unit, thereby increasing the degree of freedom of the design of the structure and appearance of an electric vehicle.

It is a further object of the invention to provide a magnetic coupling device for charging an electric vehicle which can conduct the charging operation with a high efficiency.

The magnetic coupling device for charging an electric vehicle according to the present invention is a device which is used for charging a power storage device of the electric vehicle by means of a charging power source, which includes: a primary coil unit in which a primary coil is wound on a primary core; and a secondary coil unit which is disposed on the electric vehicle and in which a secondary coil is wound on a secondary core, and in which the primary coil unit is inserted into the electric vehicle, thereby allowing the two cores to constitute a loop-like magnetic circuit, the primary coil being excited under this state by the charging power source to generate an electromotive force in the secondary coil, thereby charging the power storage device, wherein junction faces of the primary and secondary cores are formed in an insertion direction of the primary coil unit, and the primary and secondary coils are disposed at positions where, when the primary coil unit is inserted, the primary and secondary coils do not interfere with each other.

According to the invention, the junction faces of the primary and secondary cores are formed in the insertion direction of the primary coil unit. Therefore, the error of the insertion depth appears only as a small variation of the effective areas of the junction faces, and the influence exerted by the error of the insertion depth is much smaller than that in a prior art device of the junction face opposing type in which the error of the insertion depth directly appears as an increase of the size of a gap.

Further, the magnetic coupling device for charging an electric vehicle according to the present invention is a device which is used for charging a power storage device of the electric vehicle by means of a charging power source, which includes: a primary coil unit in which a primary coil is wound on a primary core; and a secondary coil unit which is disposed on the electric vehicle and in which a secondary coil is wound on a secondary core, and in which the primary coil unit is inserted into the electric vehicle, thereby allowing the two cores to constitute a loop-like magnetic circuit, the primary coil being excited under this state by the charging power source to generate an electromotive force in the secondary coil, thereby charging the power storage device, wherein an insertion direction of the primary coil unit is in parallel with a longitudinal direction of the primary coil unit.

According to this configuration, the projected area in the insertion direction can be made smaller. Consequently, the structure which is configured on the outer face of the electric vehicle in order to receive the primary coil unit can be made smaller, whereby the degree of freedom of the design of the structure and appearance of the electric vehicle can be increased.

Moreover, the magnetic coupling device for charging an electric vehicle according to the present invention is a device which is used for charging a power storage device of the electric vehicle by means of a charging power source, which includes: a primary coil unit in which a primary coil is wound on a primary core; and a secondary coil unit which is disposed on the electric vehicle and in which a secondary coil is wound on a secondary core, and in which the primary coil unit is inserted into the electric vehicle, thereby allowing the two cores to constitute a loop-like magnetic circuit, the primary coil being excited under this state by the charging power source to generate an electromotive force in the secondary coil, thereby charging the power storage device, wherein the primary and secondary coil units are provided with a wiping member which, when the primary coil unit is inserted, wipes a junction face of the core of a counter unit.

According to this configuration, when the primary coil unit is inserted into the electric vehicle, the wiping member wipes the junction face of the core of the counter unit during the process of inserting the unit. Each time when the charging operation is conducted, therefore, contamination of the junction face is automatically removed away. As a result, the increase of a gap size due to contamination is prevented from occurring, whereby magnetic properties of the magnetic circuit can be prevented from being changed.

In addition, the magnetic coupling device for charging an electric vehicle according to the present invention is a device which is used for charging a power storage device of the electric vehicle by means of a charging power source, which includes: a primary coil unit in which a primary coil is wound on a primary core; and a secondary coil unit which is disposed on the electric vehicle and in which a secondary coil is wound on a secondary core, and in which said primary coil unit is inserted into the electric vehicle, thereby joining said two cores to each other to constitute a loop-like magnetic circuit, said primary coil being excited under this state by the charging power source to generate an electromotive force in said secondary coil, thereby charging the power storage device, wherein said device further comprises an urging member which, under a state where said primary coil unit is inserted into the electric vehicle, urges at least one of said primary and secondary cores in a direction along which said cores are joined to each other.

According to this configuration, when the primary coil unit is inserted into the electric vehicle, at least one of the primary and secondary cores is urged in a direction along which the cores are joined to each other. Under a state where the primary coil unit is inserted, therefore, the primary and secondary cores can be closely contacted with each other. Consequently, the power loss is suppressed, so that the charging efficiency is improved.

BRIEF DESCRIPTION OF THE DRAWINGS FIGURES

DETAILED DESCRIPTION OF THE PREFERRED EMBODIMENTS

First Embodiment

Hereinafter, a first embodiment will be described with reference to FIGS. 1 to 4.

Figure 1:
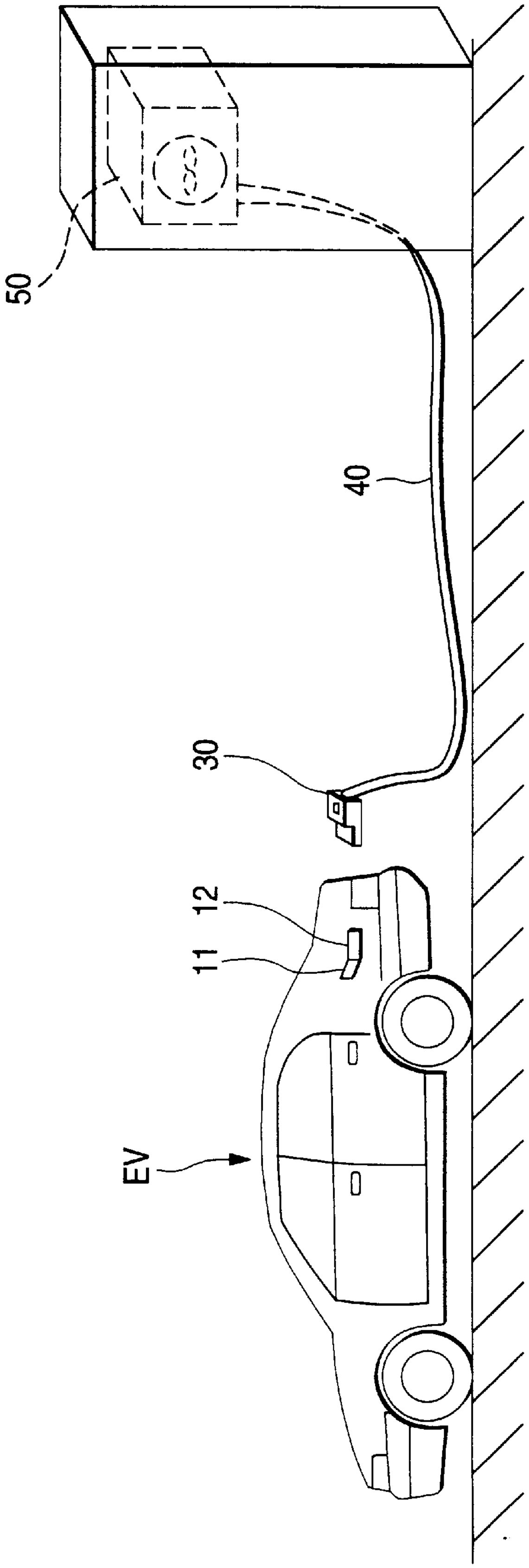
FIG. 1 is a side view diagrammatically showing a charging system according to the invention.

FIG. 1 shows the whole configuration of the system of the embodiment. A receiving unit 12 which can be opened and closed by, for example, a lid 11 is formed in the outer face of the body of an electric vehicle EV. The receiving unit 12 is configured so that a primary coil unit 30 which will be described later can be inserted. A power cable 40 for charging is connected to the primary coil unit 30. The other end of the cable 40 is connected to a high-frequency power source for charging 50.

Figure 2:
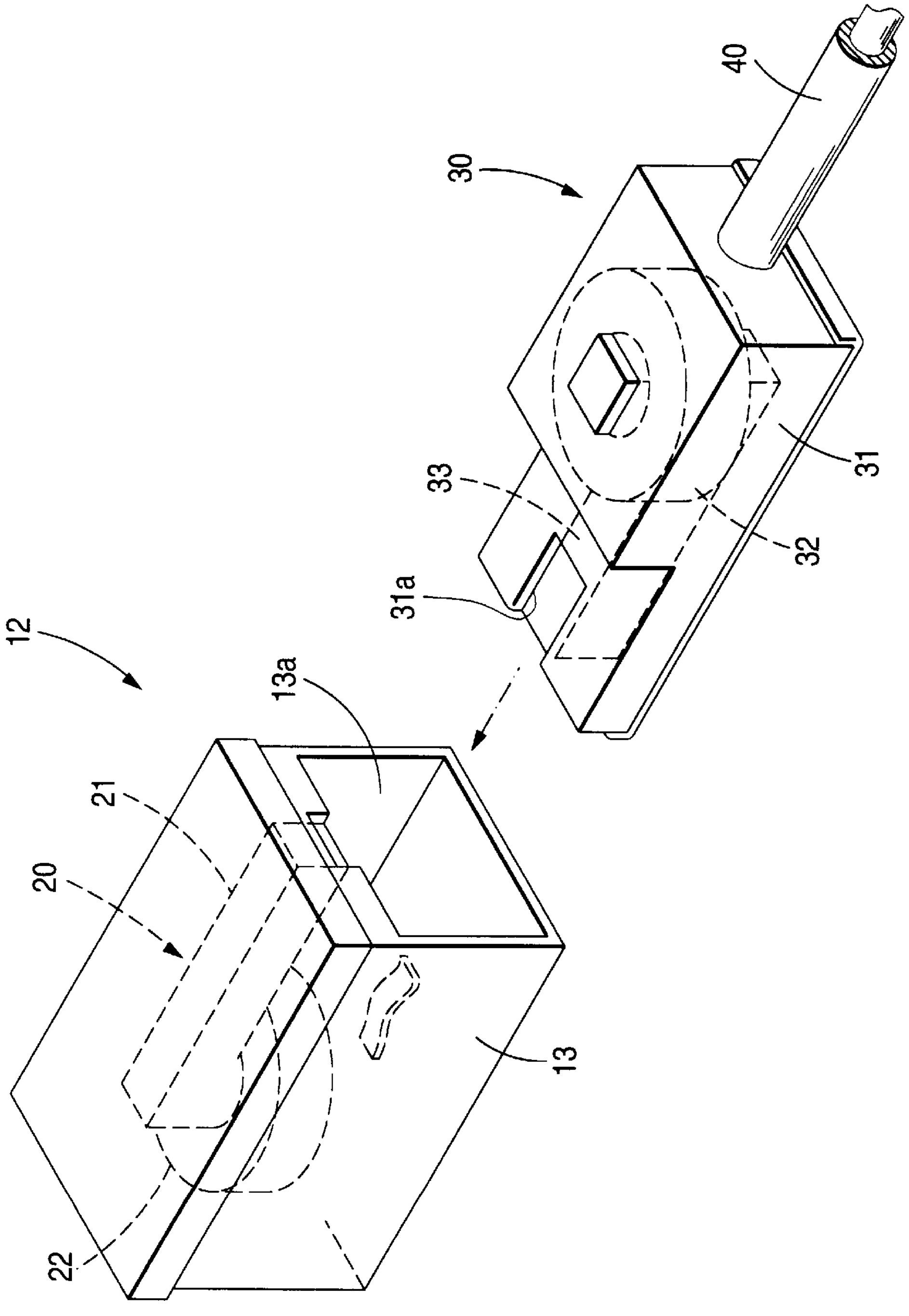
FIG. 2 is a perspective view showing primary and secondary coil units used in a first embodiment of the invention.

As shown in FIG. 2 and the following, a receiving unit case 13 forming a recess 13*a* which outward opens is attached to the receiving unit 12 of the electric vehicle EV. A secondary coil unit 20 is disposed in the case. The secondary coil unit 20 is configured by winding a secondary coil 22 on a secondary core 21 which is made of, for example, ferrite. The output terminals of the secondary coil 22 are connected to a charging circuit for charging a power battery (not shown) which is a power storage device of the electric vehicle EV, and a high-frequency electromotive force induced in the secondary coil 22 is rectified so as to be used for charging the power battery.

Figure 3:
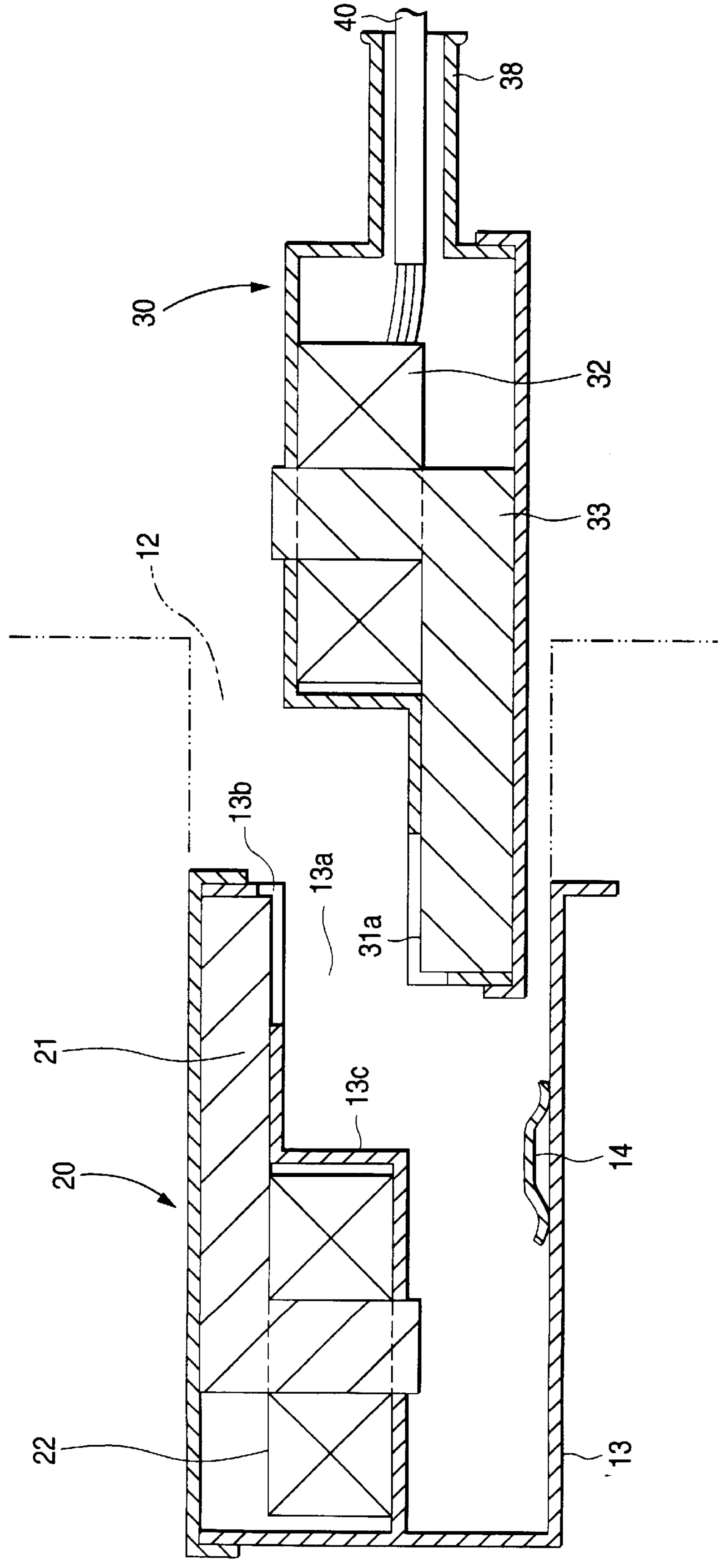
FIG. 3 is a longitudinal section view of the first embodiment.
Figure 4:
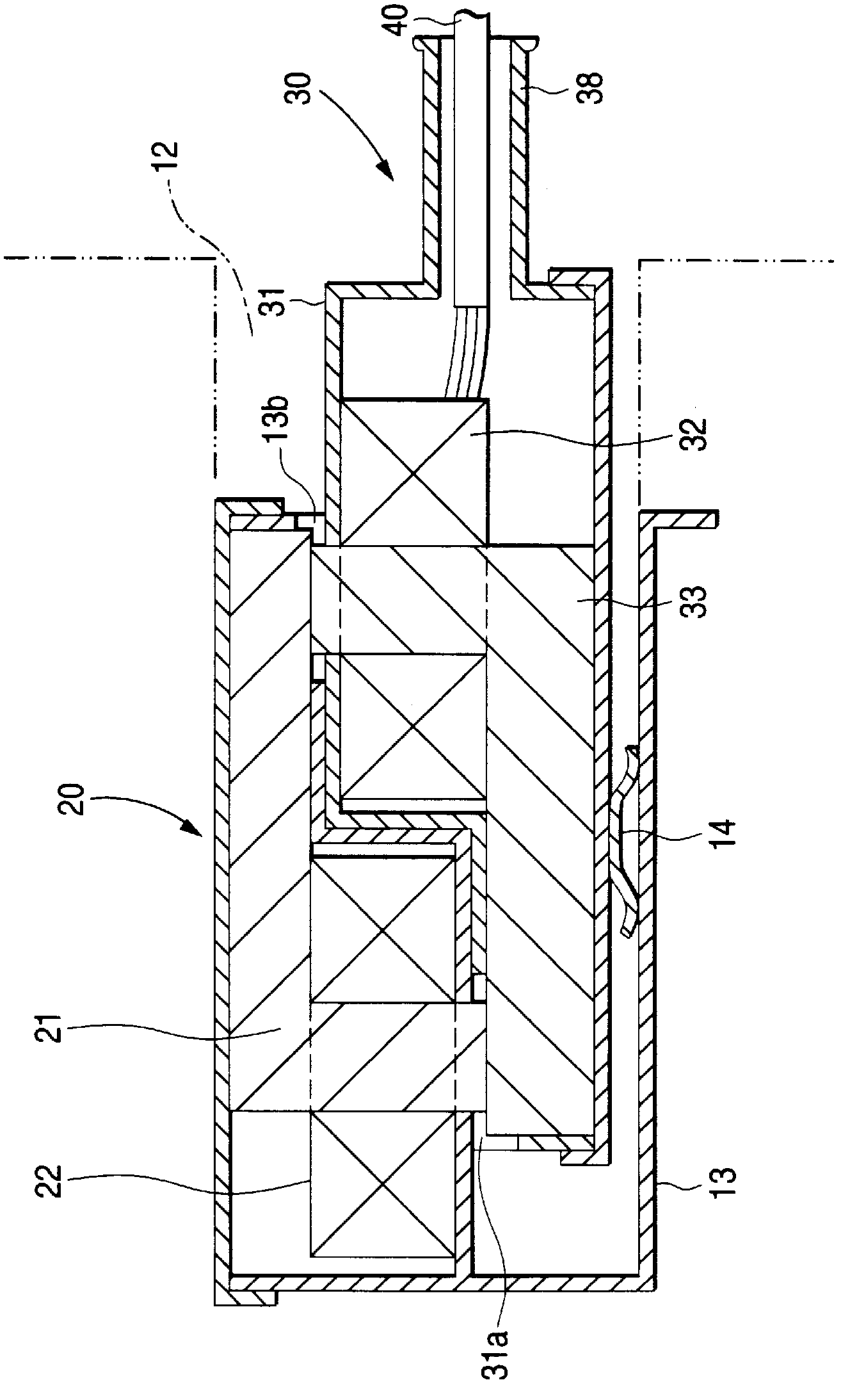
FIG. 4 is a longitudinal section view showing the first embodiment in the state where the primary coil unit is inserted.

As shown in FIGS. 2 and 3, the secondary core 21 has a shape obtained by bending, for example, a prism into an L-like shape. The core 21 is fixed to the receiving unit case 13 with laterally directing the long side of the L-like shape. In the inner side of the recess 13*a*, the short side of the L-like shape downward elongates and the lower end portion of the short side passes through the receiving unit case 13 so as to be slightly protruded into the recess 13*a*. The lower face of the tip end of the long side of the L-like shape is exposed to the interior of the recess 13*a* through an opening 13*b* which is formed in the vicinity of the open end of the receiving unit case 13. A plate spring 14 is attached to the bottom of the recess 13*a* of the receiving unit case 13, so that the primary coil unit 30 inserted into the recess 13*a* is urged upwardly (toward the secondary coil unit 20).

On the other hand, the primary coil unit 30 is configured by housing a primary coil 32 and a primary core 33 in a housing 31 having a flat box-like shape. The primary core 33 is identical with the secondary core 21, and fixed to the housing 31 with directing the long side of the L-like shape in the longitudinal direction of the housing 31. The short side of the L-like shape upward elongates at the vicinity of the base of the housing 31, and the primary coil 32 is wound on the short side. The primary coil 32 is flat and disposed in a vertical shaft type, and has a shape which elongates in the insertion direction as seen from a lateral side. The upper end face of the short side of the L-like shape passes through the housing 31 so as to be protruded into the outside. The upper face of the tip end of the long side of the L-like shape is exposed to the outside through an opening 31*a* which is formed in the tip end portion of the housing 31. When the primary coil unit 30 is inserted into the recess 13*a* of the receiving unit case 13 of the electric vehicle EV in the longitudinal direction of the primary core 33, therefore, the upper face of the tip end portion of the long side of the primary core 33 slides over the lower end face of the short side of the secondary core 21, and then enters the state where the two faces oppose each other. Also the upper face of the short side of the primary core 33 slides over the lower face of the tip end of the long side of the secondary core 21, and then enters the state where the two faces oppose each other. When the primary coil unit 30 is inserted to the innermost portion where the unit abuts against a step portion 13*c* in the receiving unit case 13 (see FIG. 4), the plate spring 14 attached to the bottom of the recess 13*a* upward urges the primary coil unit 30, thereby causing the opposing faces of the cores 21 and 33 to be in substantial contact with each other. As a result, a magnetic circuit of a single closed loop is formed by the cores 21 and 33. When the primary coil 32 is then excited via the power cable for charging 40, an electromotive force is generated in the secondary coil 22, with the result that the power battery of the electric vehicle EV is charged.

The opening 13*b* of the receiving unit case 13, and the opening 31*a* of the housing 31 which respectively receive the end faces of the short sides of the cores 21 and 33 are formed so as to be large in order to ensure the reception of the end faces. With respect to the insertion direction of the primary coil unit 30, particularly, the openings are sufficiently longer than the end faces.

The power cable for charging 40 is introduced into the housing 31 with passing through a tube 38 which is integrally protruded from the base of the housing 31 and is used as handle, and then connected to the primary coil 32 in the housing 31.

The thus configured embodiment can attain the following effects.

(1) During the process of inserting the primary coil unit 30 into the receiving unit case 13, the junction faces of the primary core 33 slide over those of the secondary core 21 and then establish the opposing state of the junction faces. Even if the insertion depth of the primary coil unit 30 is insufficient and the positions of the junction faces of the primary core 33 are longitudinally deviated from the designed positions in the insertion direction, the "deviation" exerts entirely no influence on the size of the gap between the junction faces and appears only as a small variation of the effective areas of the junction faces. Namely, the influence exerted by the error of the insertion depth is very smaller than that in a prior art device of the junction face opposing type in which the error of the insertion depth directly appears as an increase of the size of a gap.

In the embodiment, particularly, the openings 13*b* and 31*a* of the receiving unit case 13 and the housing 31 have a dimension in the insertion direction which is larger than the dimensions of the end faces of the cores 21 and 33 in the same direction. Even if there is a deviation of a some degree in the insertion direction, therefore, the whole area of each end face is always joined to the counter core. As a result, the tolerance of the positional deviation in the insertion direction can be set to be sufficiently large. Additionaly, since the primary coil 32 is flat and disposed in a vertical shaft type, and has a shape which elongates in the insertion direction as seen from a lateral side, the projected direction in the insertion direction can be made smaller.

(2) In the embodiment, the primary core 33 is formed into an L-like shape and the primary coil unit 30 is inserted in the longitudinal direction of the primary core 33. Therefore, the projected area of each of the primary and secondary coil units 30 and 20 in the insertion direction can be made small. This means that the receiving unit 12 which is disposed on the electric vehicle EV in order to receive the primary coil unit 30 occupies a small area on the surface of the vehicle body. Consequently, the degree of freedom of the design of the structure and appearance of the electric vehicle EV can be increased.

(3) When the primary coil unit 30 is inserted into the recess 13*a* of the receiving case 13, the primary coil unit 30 is upward urged by the plate spring 14 during the course of the insertion. Then, the primary coil unit 30 is pushed into the position where the unit abuts against the step portion 13*c*, so as to be completely housed in the recess 13*a*. As a result, the lower end face of the short side of the secondary core 21 is contacted with the upper face of the tip end portion of the long side of the primary core 33 via the opening 31*a*, and the upper end face of the short side of the primary core 33 is contacted with the lower face of the tip end portion of the long side of the secondary core 21 via the opening 13*b*. In other words, the primary coil unit 30 is upward urged by the plate spring 14, thereby causing the opposing faces of the primary and secondary cores 33 and 21 to be closely contacted with each other. As a result, a magnetic circuit of a single closed loop is formed by the cores 21 and 33. When the primary coil 32 is then excited via the power cable for charging 40, an electromotive force is generated in the secondary coil 22, with the result that the power battery of the electric vehicle EV is charged.

In this way, in the embodiment, the primary coil unit 30 is upward urged by the plate spring 14, and hence the primary and secondary cores 33 and 21 are closely contacted with each other without forming a gap, so that the magnetic resistance of the magnetic circuit is prevented from being increased, thereby suppressing the power loss. As a result, the charging efficiency can be improved.

Second Embodiment

Figure 5:
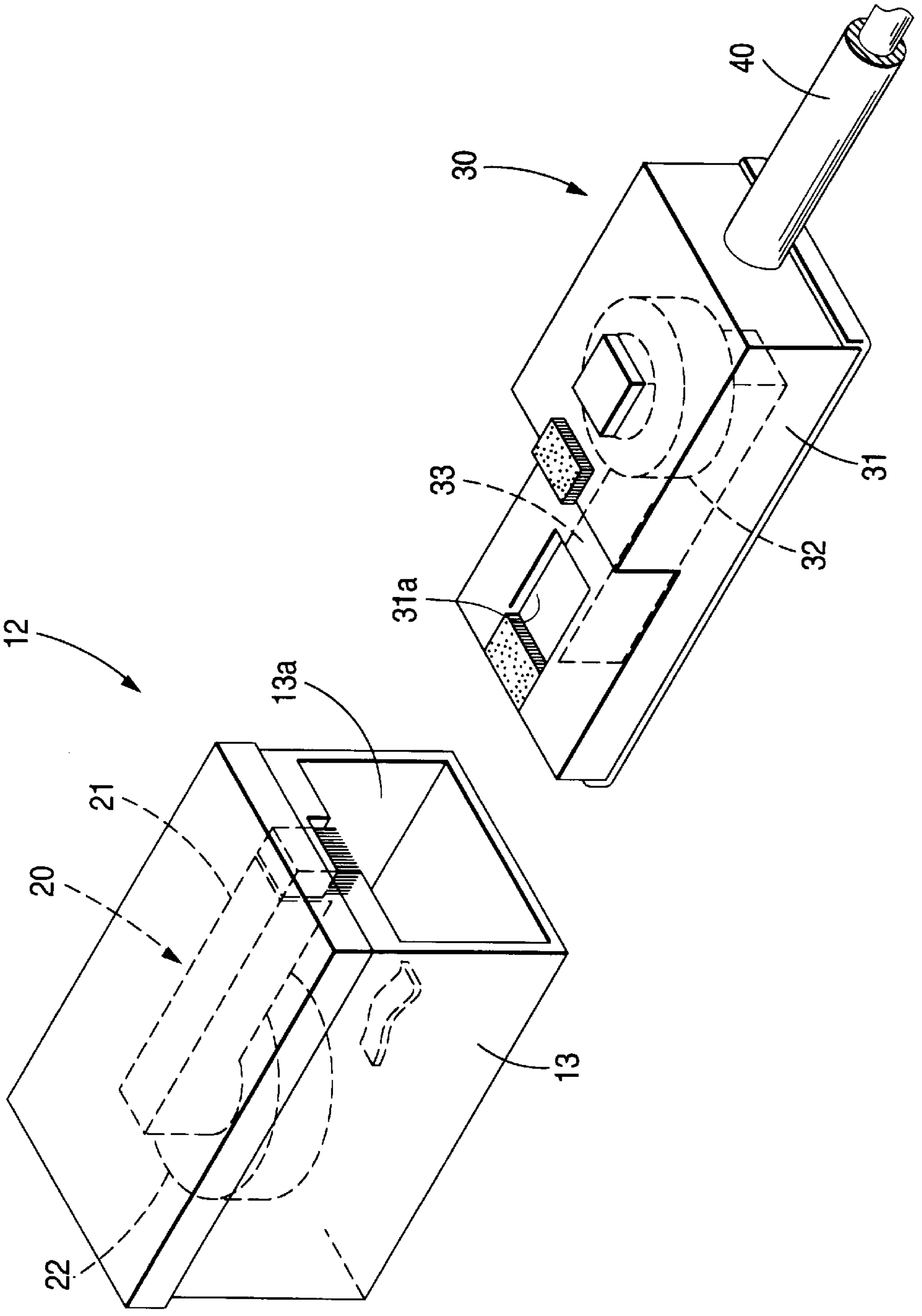
FIG. 5 is a perspective view showing primary and secondary coil units used in a second embodiment of the invention.
Figure 6:
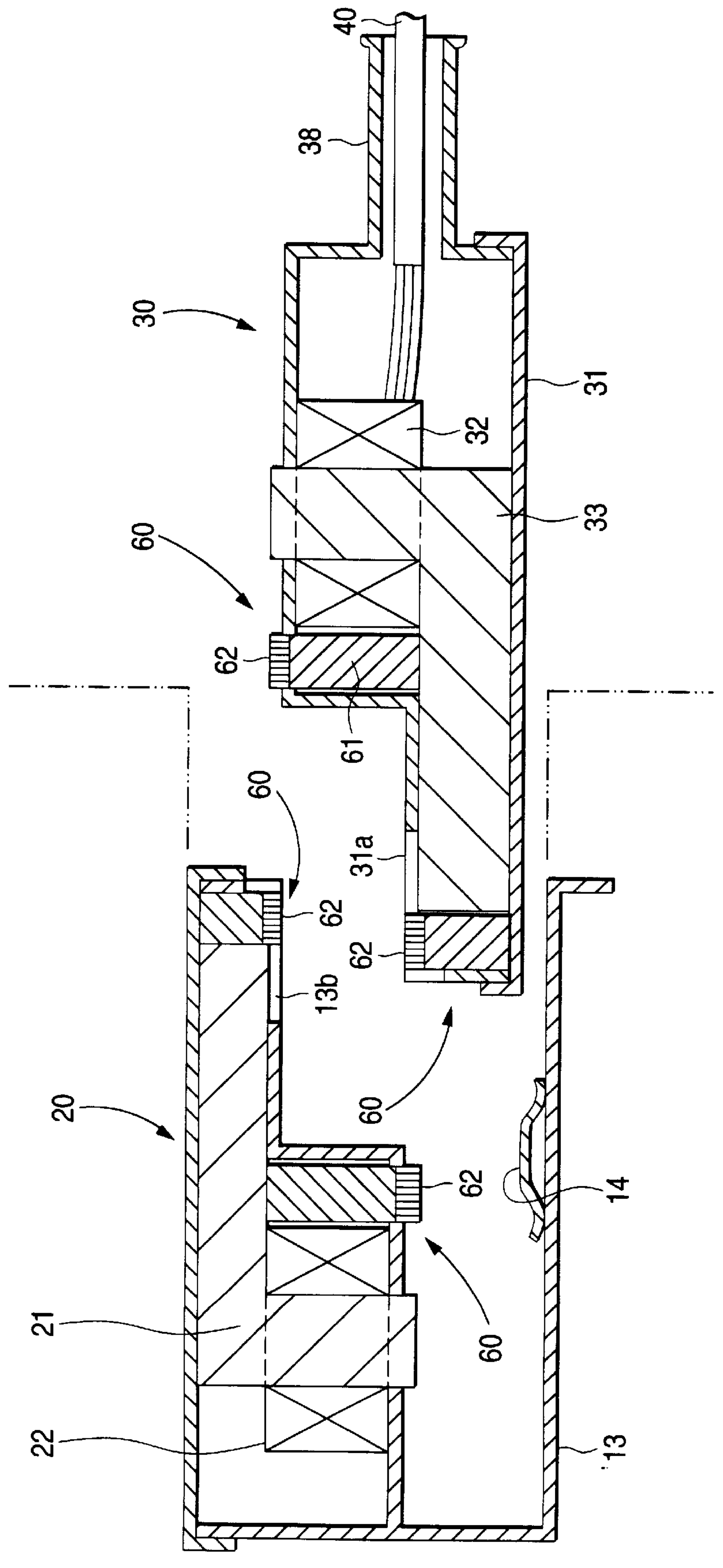
FIG. 6 is a longitudinal section view of coil units of a second embodiment.
Figure 7:
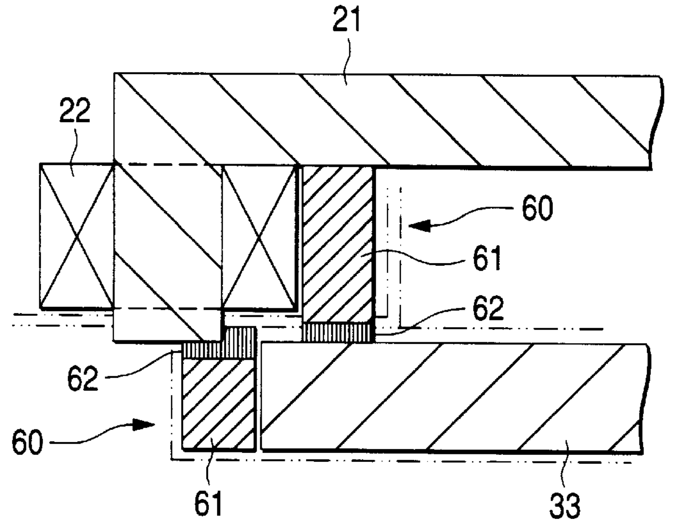
FIG. 7 is an enlarged longitudinal section view of the main portion of the second embodiment and showing the function of wiping members.

FIGS. 5 to 7 show a second embodiment of the invention.

The embodiment is different from the first embodiment in that wiping members are added to the structure of the first embodiment. The other components are configured in the same manner as those of the first embodiment. Therefore, these components are designated by the same reference numerals, and the duplicated description is omitted.

Four wiping members 60 having a structure in which a cleaning head 62 made of, for example, felt is attached to an upper end of a base 61 are mounted onto the tip ends of the long and short sides of the primary and secondary cores 33 and 21, respectively. The upper end portion of each cleaning head 62 is positioned at a level where, when the primary coil unit 30 is inserted, the upper end portion can contact with the core 21 or 33 of the counter unit. During the process of inserting the primary coil unit 30 with starting from the state shown in FIG. 6, therefore, the cleaning heads 62 of each coil unit rub the junction faces of the core 21 or 33 of the counter unit as shown in FIG. 7.

According to the embodiment, each time when the primary coil unit 30 is inserted, therefore, the junction faces of the cores 21 and 33 are rubbed with the cleaning heads 62 of the wiping members 60 during the insertion process, and contamination is removed away. As a result, the junction faces of the cores 21 and 33 can be closely contacted with each other with a gap of the minimum size. This produces a further effect that the magnetic resistance can be reduced.

Third Embodiment

Figure 8:
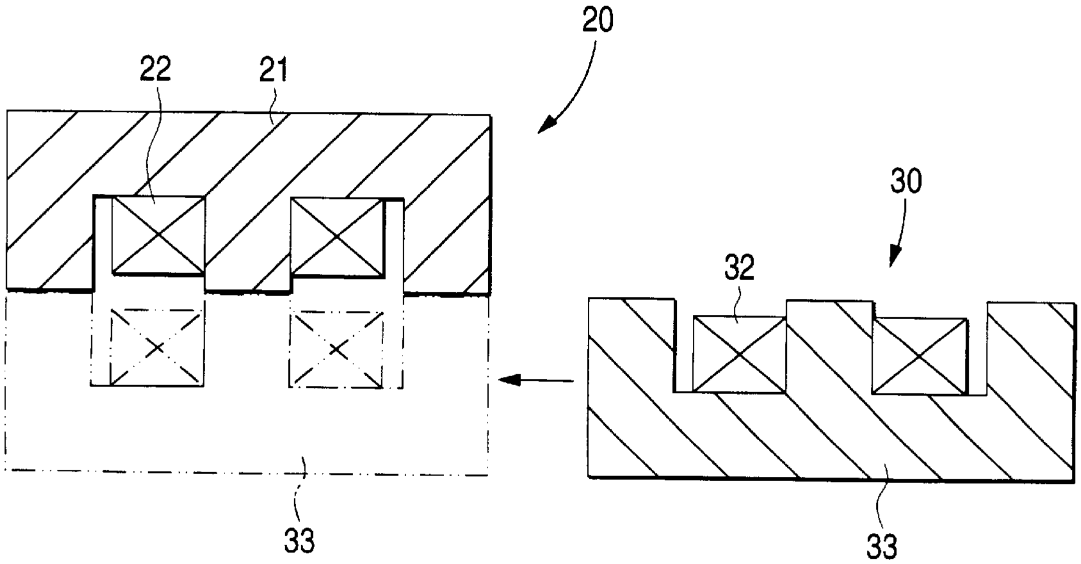
FIG. 8 is a section view of cores of a third embodiment.

FIG. 8 shows a third embodiment of the invention. The embodiment is different from the first embodiment in the shapes of the primary and secondary cores 33 and 21. The cores have an E-like shape which elongates in the insertion direction of the primary coil unit 30.

The embodiment is similar to the first embodiment in that the junction faces of the primary and secondary cores 33 and 21 are formed in the insertion direction of the primary coil unit 30, that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit.

Even if the primary coil unit 30 is positionally deviated with respect to the insertion direction, therefore, the performance of the magnetic circuit is hardly affected by the deviation. Furthermore, the projected area of each of the primary and secondary coil units 30 and 20 in the insertion direction can be made small. Consequently, the receiving unit 12 of the electric vehicle EV occupies a small area on the surface of the vehicle body, thereby attaining an effect that the degree of freedom of the design of the structure and appearance of the electric vehicle EV can be increased.

Fourth Embodiment

Figure 9:
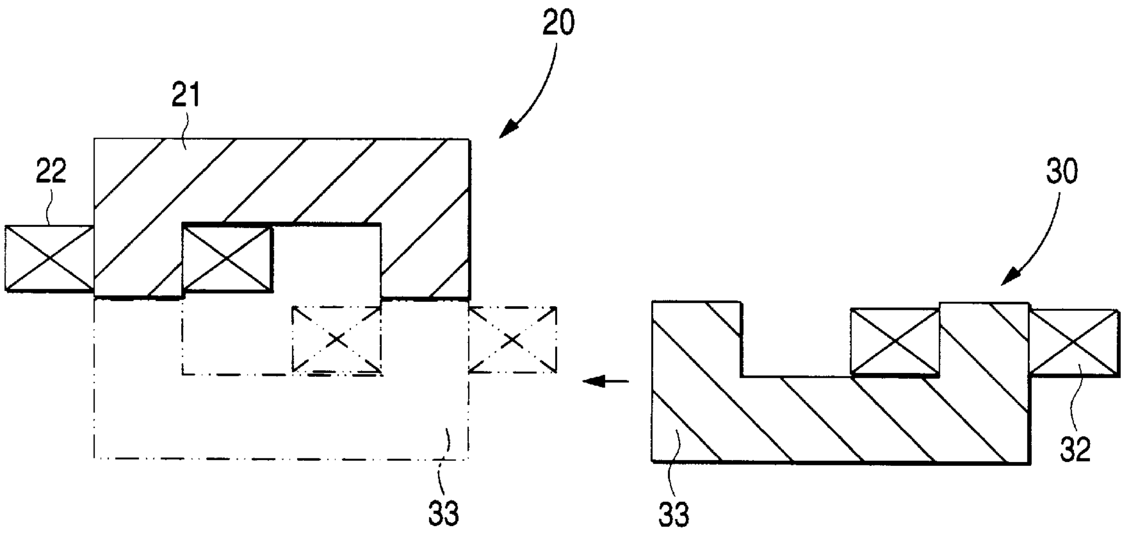
FIG. 9 is a section view of cores of a fourth embodiment.

FIG. 9 shows a fourth embodiment of the invention. The embodiment is different from the first embodiment in that the primary and secondary cores 33 and 21 have a rectangular U-like shape which elongates in the insertion direction of the primary coil unit 30.

The embodiment is similar to the first embodiment in that the junction faces of the primary and secondary cores 33 and 21 are formed in the insertion direction of the primary coil unit 30, that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit.

Also in the embodiment, even if the primary coil unit 30 is positionally deviated with respect to the insertion direction, therefore, the performance of the magnetic circuit is hardly affected by the deviation. Furthermore, the projected area of each of the primary and secondary coil units 30 and 20 in the insertion direction can be made small. Consequently, the receiving unit 12 of the electric vehicle EV occupies a small area on the surface of the vehicle body, thereby attaining an effect that the degree of freedom of the design of the structure and appearance of the electric vehicle EV can be increased.

Fifth Embodiment

Figure 10:
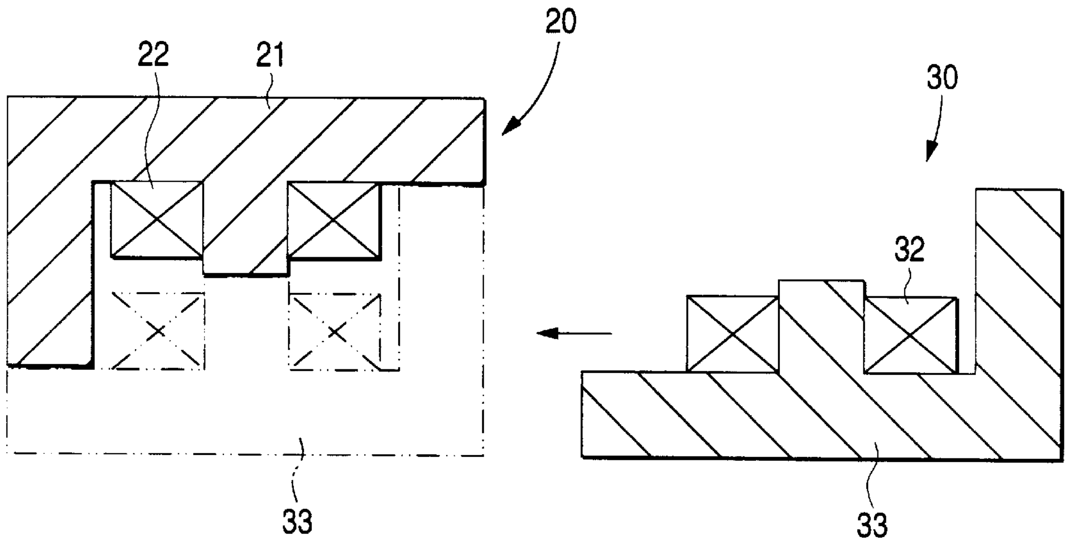
FIG. 10 is a section view of cores of a fifth embodiment.

FIG. 10 shows a fifth embodiment of the invention. The embodiment is different from the first embodiment in that the primary and secondary cores 33 and 21 have an F-like shape which elongates in the insertion direction of the primary coil unit 30.

The embodiment is similar to the first embodiment in that the junction faces of the primary and secondary cores 33 and 21 are formed in the insertion direction of the primary coil unit 30, that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit.

Also in the embodiment, even if the primary coil unit 30 is positionally deviated with respect to the insertion direction, therefore, the performance of the magnetic circuit is hardly affected by the deviation. Furthermore, the projected area of each of the primary and secondary coil units 30 and 20 in the insertion direction can be made small. Consequently, the receiving unit 12 of the electric vehicle EV occupies a small area on the surface of the vehicle body, thereby attaining an effect that the degree of freedom of the design of the structure and appearance of the electric vehicle EV can be increased.

Sixth Embodiment

Figure 11:
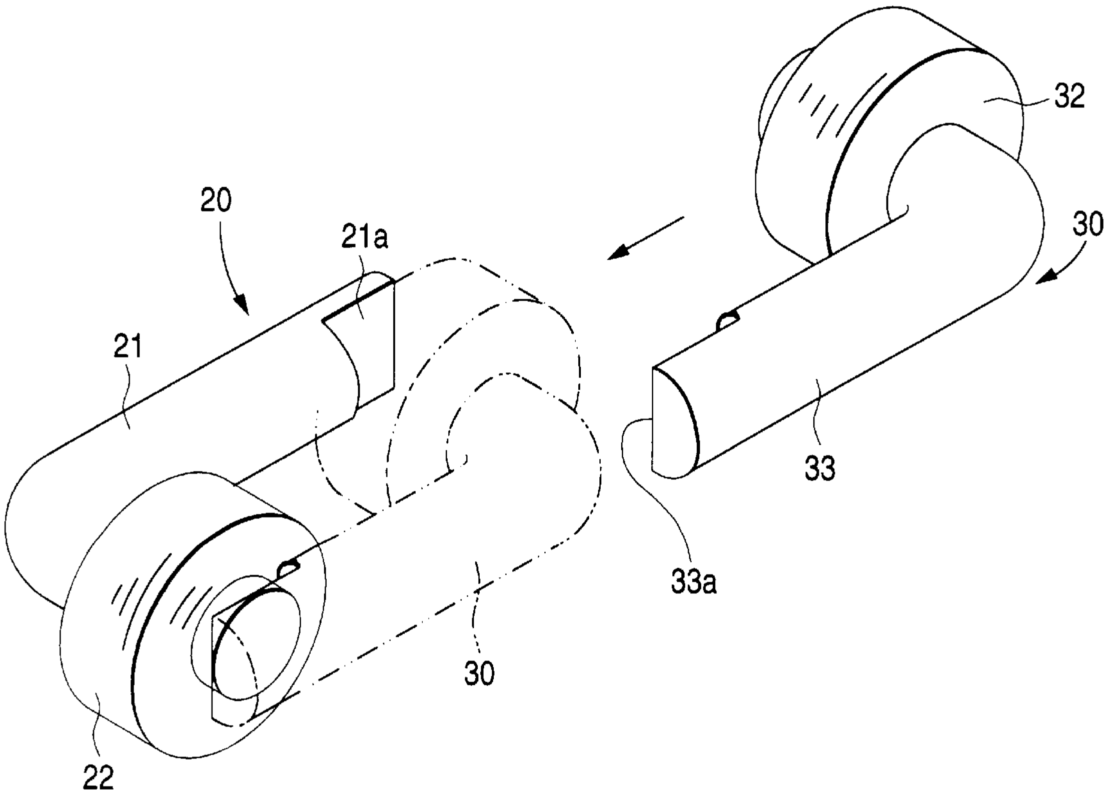
FIG. 11 is a perspective view of cores of a sixth embodiment.

FIG. 11 shows a sixth embodiment of the invention. The embodiment is different from the first embodiment in the shapes of the primary and secondary cores 33 and 21.

In the first embodiment, the cores 33 and 21 have a prism-like shape. In the present embodiment, the cores have a shape which is obtained by bending a round bar into an L-like shape. In this case, the short side of each L-like shape must be joined to the side portion of the long side of the counter core. Therefore, it is preferable to form flat faces 21*a* and 33*a* on the Elide portions of the long sides, thereby allowing the end faces of the short sides to be closely contacted with the flat faces.

The embodiment is similar to the first embodiment in that the junction faces of the primary and secondary cores 33 and 21 are formed in the insertion direction of the primary coil unit 30, that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit.

Also in the embodiment, even if the primary coil unit 30 is positionally deviated with respect to the insertion direction, therefore, the performance of the magnetic circuit is hardly affected by the deviation exerts. Furthermore, the projected area of each of the primary and secondary coil units 30 and 20 in the insertion direction can be made small. Consequently, the receiving unit 12 of the electric vehicle EV occupies a small area on the surface of the vehicle body, thereby attaining an effect that the degree of freedom of the design of the structure and appearance of the electric vehicle EV can be increased. Since the cores 21 and 33 have a column-like shape as described above, moreover, it is possible to attain the effects that the works of winding the coils 22 and 32 independently from the cores and then attaching the coils to the cores can be easily conducted, and that the closeness between the coils 22 and 32 and the cores 21 and 33 is improved.

Seventh Embodiment

Figure 12:
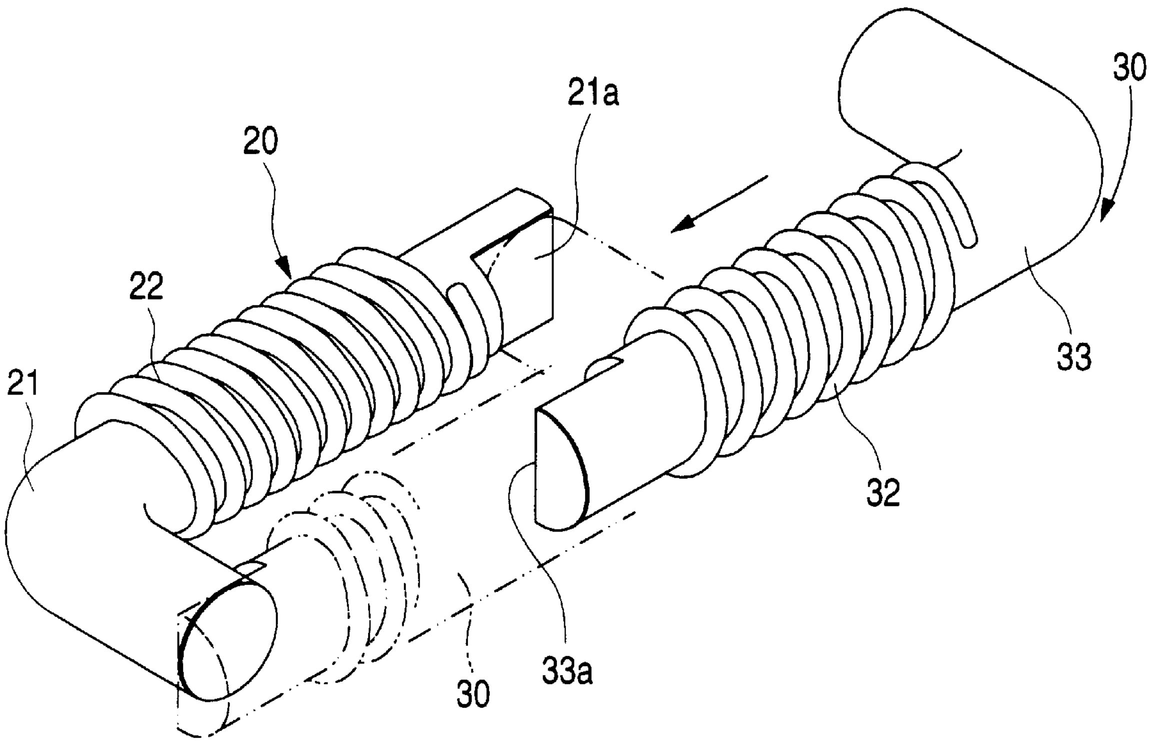
FIG. 12 is a perspective view of cores of a seventh embodiment.

FIG. 12 shows a seventh embodiment of the invention. The embodiment is different from the first embodiment in the shapes of the primary and secondary cores 33 and 21 and the positions where the coils 22 and 32 are wound.

In the same manner as the sixth embodiment, the cores 33 and 21 have a shape which is obtained by bending a round bar into an L-like shape. The flat faces 21*a* and 33*a* are formed on the side portions of the long sides, and the end faces of the short sides slide over so as to oppose the flat faces, respectively. The primary and secondary 32 and 22 are wound on the long sides of the cores 33 and 21 so as to have a solenoid-like shape which axially elongates, whereby the projected area with respect to the insertion direction of the primary coil unit 30 can be made as small as possible. The embodiment is similar to the first embodiment in that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit. The embodiment also attains the effects that the performance of the magnetic circuit is little affected by positional deviation with respect to the insertion direction of the primary coil unit 30, and that the degree of freedom of the design of the structure and appearance of the electric vehicle EV can be increased. Since the cores 33 and 21 have a round bar-like shape, in the same manner as the embodiment described above, it is possible to attain the effects that the works of winding the coils and then attaching the coils to the cores can be easily conducted, and that the closeness between the coils and the cores 21 and 33 is improved.

Eighth Embodiment

Figure 13:
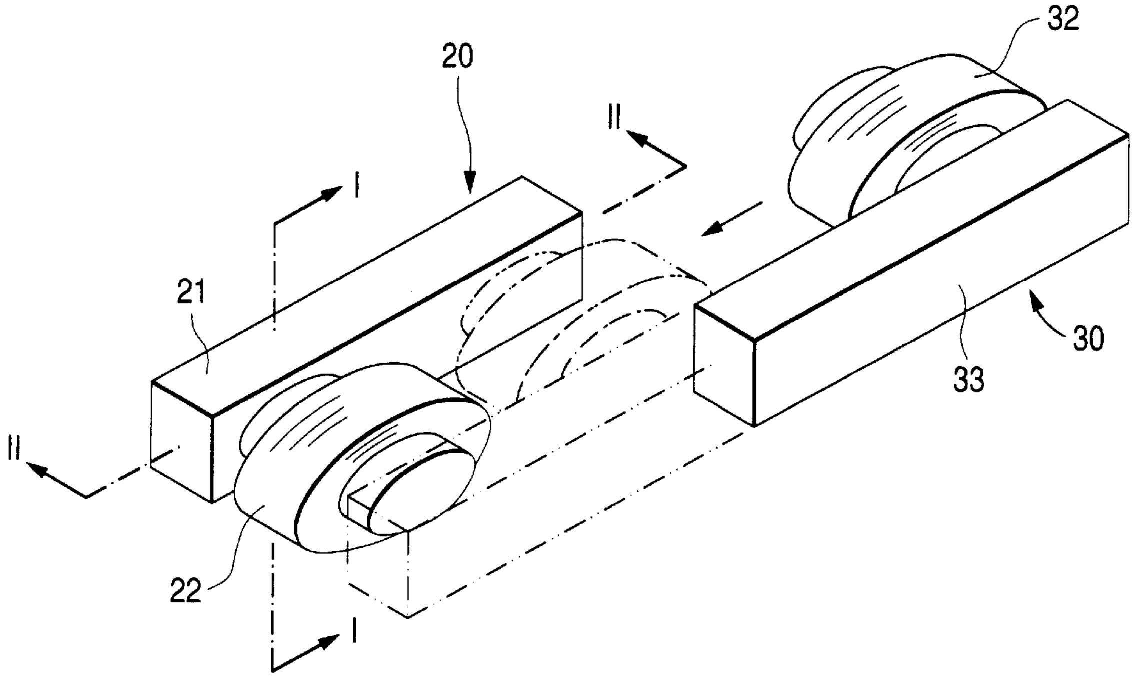
FIG. 13 is a perspective view of cores of an eighth embodiment.
Figure 14:
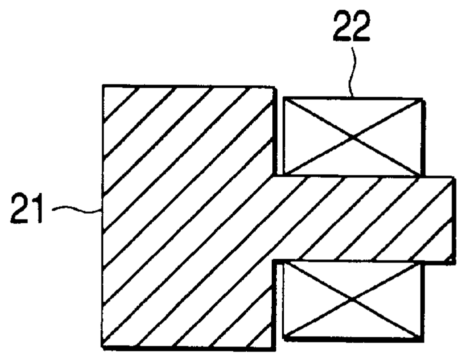
FIG. 14 is a section view taken along the line I—I of FIG. 13.
Figure 15:
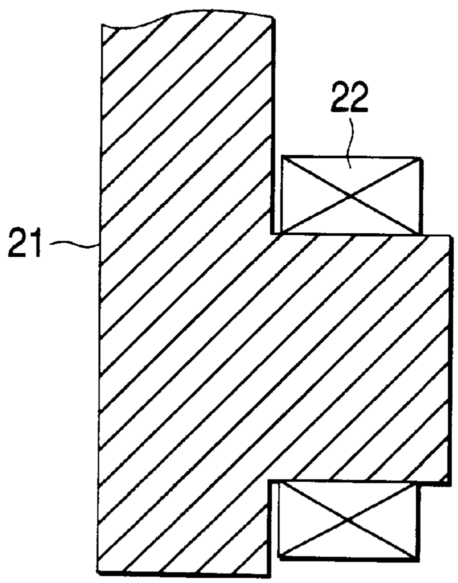
FIG. 15 is a section view taken along the line II—II of FIG. 13.

FIGS. 13 to 15 show an eighth embodiment of the invention. The cores 33 and 21 are formed into an L-like shape as a whole. However, the long sides of the cores have a prism-like shape and the short sides have a column-like shape having an oval section shape. As apparent from FIGS. 14 and 15, therefore, the coils 32 and 22 wound on the short sides have an oval shape which horizontally elongates in the insertion direction of the primary coil unit 30.

According to this configuration, the projected area with respect to the insertion direction of the primary coil unit 30 can be made further smaller, thereby attaining an effect that the degree of freedom of the design of the structure and appearance of the electric vehicle EV is further increased. The embodiment is similar to the first embodiment in that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit. The embodiment also attains the effects that the performance of the magnetic circuit is little affected by positional deviation with respect to the insertion direction of the primary coil unit 30, and that the degree of freedom of the design of the structure and appearance of the electric vehicle EV can be increased. Since the short sides have an oval column-like shape, in the same manner as the sixth embodiment, it is possible to attain the effects that the works of winding the coils and then attaching the coils to the cores can be easily conducted, and that the closeness between the coils and the cores 21 and 33 is improved.

Ninth Embodiment

Figure 16:
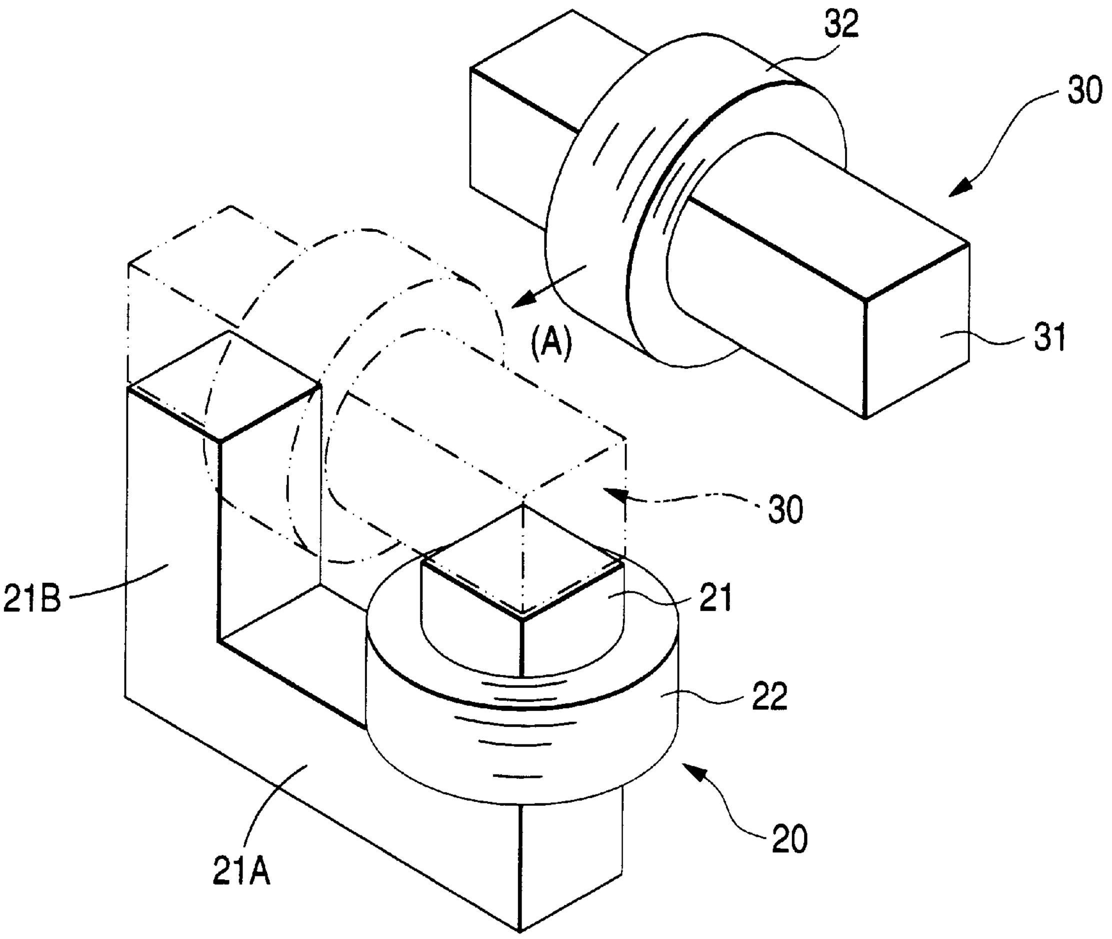
FIG. 16 is a perspective view showing primary and secondary coil units used in a ninth embodiment of the invention.

Hereinafter, a ninth embodiment of the invention will be described with reference to FIGS. 16 and 17.

A secondary unit 20 consists of a secondary core 21 and a secondary coil 22. The secondary core 21 is made of, for example, ferrite and has a rectangular U-like shape having a pair of legs 21B which perpendicularly elongate from ends of a bottom portion 21A, respectively. In the core, a section which crosses the magnetic path has a rectangular shape. The secondary coil 22 is configured by a litz wire and wound on one leg 21B. The secondary coil is connected to a charging circuit (not shown) of an electric vehicle so that a power battery of the electric vehicle is charged by an electromotive force induced in the secondary coil.

On the other hand, the primary unit 30 consists of a primary core 31 and a primary coil 32 and is housed in a case which is not shown. The primary core 31 is made of ferrite and has a prism-like shape in which a section is rectangular. A litz wire is wound at the center of the prism-like shape so as to constitute the primary coil 32. The primary unit 30 is moved in the direction of the arrow from the state indicated by the solid line in FIG. 16, and then attached so as to bridge the tip ends of the legs 21B of the secondary core 21 as indicated by the two-dot chain line. The junction faces of the primary and secondary cores 31 and 21 are formed as faces which elongate along the attaching direction (the direction of the arrow) of the primary unit 30. The primary coil 32 is connected to a power source for charging which is not shown. When the electric vehicle is to be charged, a high-frequency current is supplied to the coil so as to attain excitation.

Figure 17:
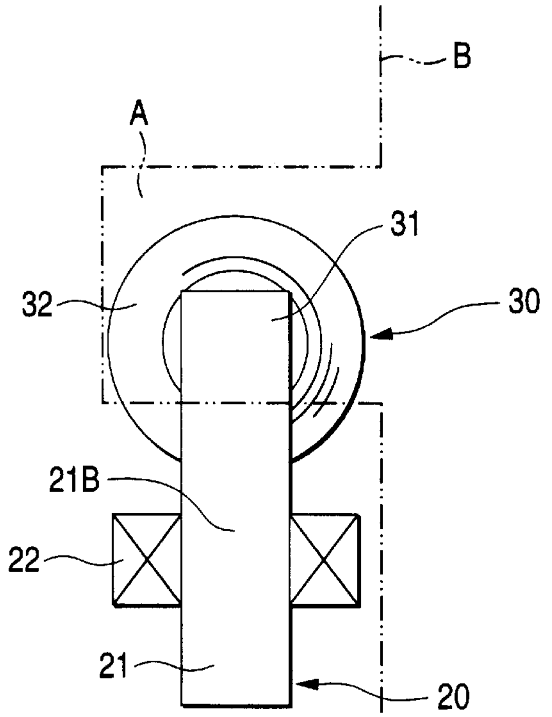
FIG. 17 is a side view showing a state that the primary coil unit is disposed in a receiving unit of a electric vehicle according to the ninth embodiment of the invention.

As shown in FIG. 17, the secondary unit 20 is disposed below a receiving unit A which is formed by depressing a predetermined portion of the body B of the electric vehicle. The tip end faces (coupling faces) of the legs 21B of the secondary core 21 are exposed to the interior of the receiving unit A. The secondary unit 20 is disposed so that the coupling faces of the secondary core 21 cross the attaching direction of the primary unit 30 and are laterally arranged with respect to the direction. Therefore, the secondary unit 20 is disposed so as to be thin with respect to the attaching direction of the primary unit 30.

According to the embodiment, the primary unit 30 is attached so that the longitudinal direction of the primary core 31 elongates along the direction which perpendicularly intersects with the attaching direction (A), and hence the depth of a space which is required for the receiving unit A on the side of the electric vehicle can be made considerably small. Since the secondary unit 20 is disposed so as to be thin with respect to the attaching direction of the primary unit 30, the space below the receiving unit A can be made small. Therefore, the arrangement space for the whole of the device can be set to have a small depth. As a result, the degree of freedom of the design for mounting the device on the electric vehicle can be increased, and the power receiving unit can be disposed at a desired position in consideration of the design, and the like.

In the embodiment, moreover, during the process of inserting the primary coil unit 30 into the receiving unit A, the junction faces of the primary core 31 slide over those of the secondary core 21 and then establish the opposing state of the junction faces. Even if the insertion depth of the primary coil unit 30 is insufficient and the positions of the junction faces of the primary core 31 are longitudinally deviated from the designed positions in the insertion direction, therefore, the "deviation" exerts entirely no influence on the size of the gap between the junction faces and appears only as a small variation of the effective areas of the junction faces. Namely, the influence exerted by the error of the insertion depth is very smaller than that in a prior art device of the junction face opposing type in which the error of the insertion depth directly appears as an increase of the size of a gap.

Tenth Embodiment

Figure 18:
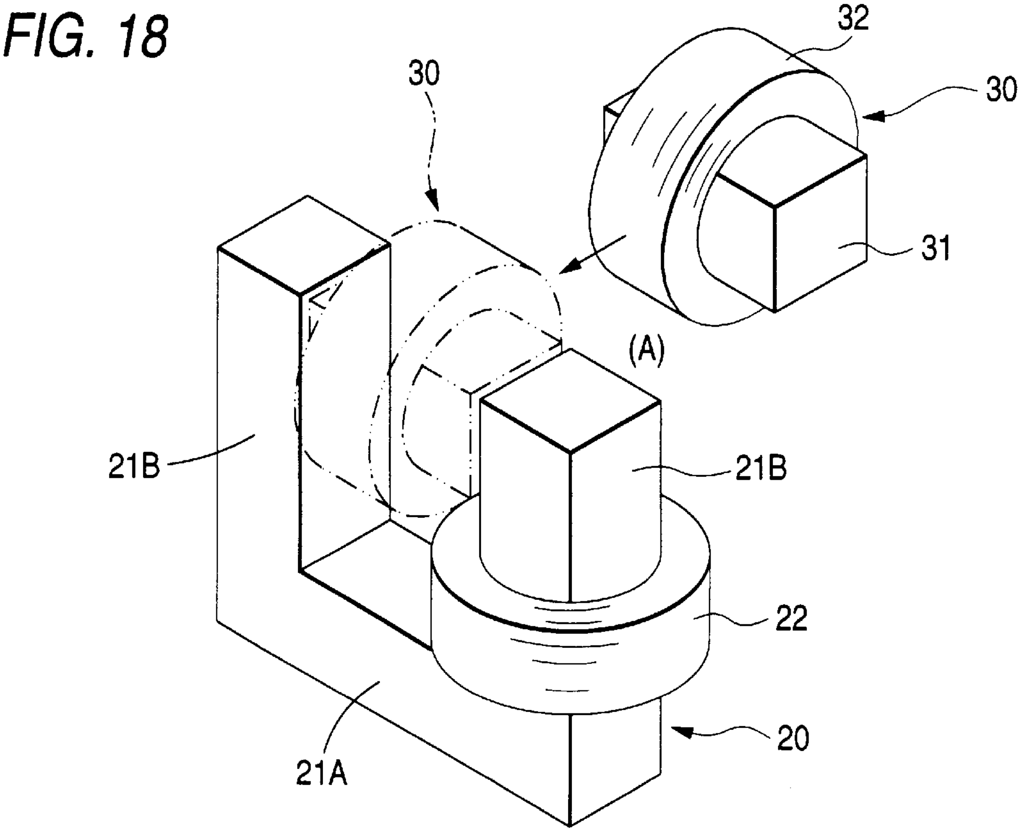
FIG. 18 is a perspective view showing primary and secondary coil units used in a tenth embodiment of the invention.

FIG. 18 shows a tenth embodiment of the invention. The embodiment is different from the ninth embodiment in the shapes of the primary and secondary cores 31 and 21. The other components are configured in the same manner as those of the ninth embodiment. Therefore, the duplicated description is omitted, and only different components will be described.

The legs 21B of the secondary core 21 are longer than those of the first embodiment, and the primary core 31 is shorter than that of the ninth embodiment so that the primary core can be inserted between the legs 21B. Also in this configuration, the primary unit 30 is attached so that the longitudinal direction of the primary core 31 elongates along the direction which perpendicularly intersects with the attaching direction (A), and hence the depth of a space which is required for the receiving unit A on the side of the electric vehicle can be made small. Furthermore, the secondary unit 20 is disposed so as to be thin with respect to the attaching direction of the primary unit 30, and therefore the arrangement space for the whole of the device can be set to have a small depth.

In the same manner as the ninth embodiment, therefore, the degree of freedom of the design for mounting the device on the electric vehicle can be increased. Moreover, the primary core 31 slides over the secondary core 21 and then establish the opposing state of the cores. Even if there occurs an error in the insertion depth, therefore, the magnetic resistance is not rapidly increased. As a result, the embodiment can attain an effect that the influence exerted by the error of the insertion depth is very smaller than that exerted in a prior art device of the junction face opposing type in which the error of the insertion depth directly appears as an increase of the size of a gap.

Eleventh Embodiment

Figure 19:
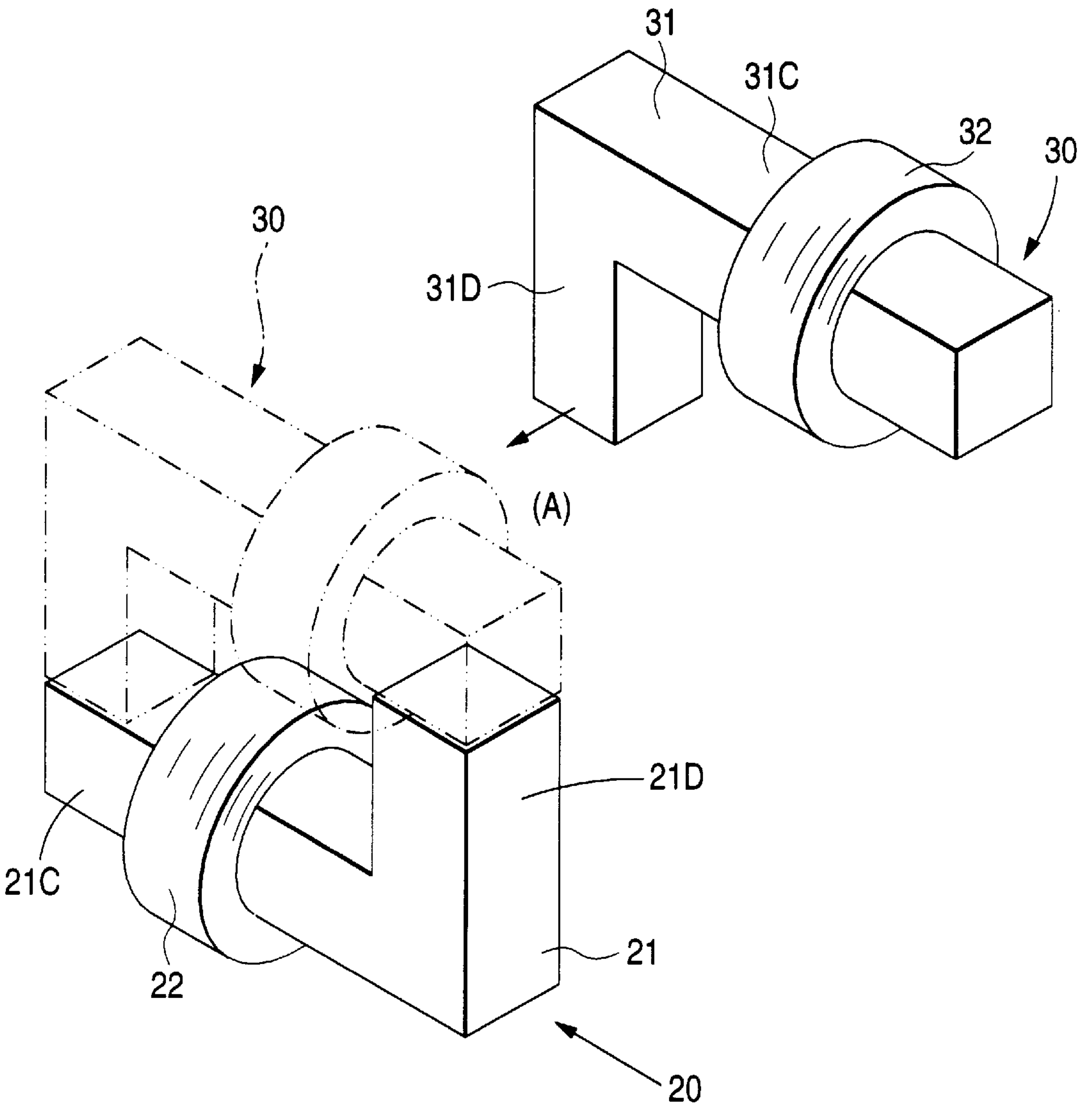
FIG. 19 is a perspective view showing primary and secondary coil units used in an eleventh embodiment of the invention.

FIG. 19 shows an eleventh embodiment of the invention. The embodiment is different from the ninth embodiment in the shapes of the primary and secondary cores 31 and 21. The other components are configured in the same manner as those of the ninth embodiment. Therefore, the duplicated description is omitted, and only different components will be described.

Both the primary and secondary cores 31 and 21 have the same L-like shape. The primary and secondary coils 32 and 22 are wound on the long sides 31C and 21C of the cores, respectively. When the primary unit 30 is moved in the direction of the arrow in the figure so as to attain an attached state to the secondary unit 20, the tip end of the long side 31C of the primary core 31 is coupled to a side face of the tip end of the short side 21D of the secondary core 21 and that of the short side 31D of the primary core 31 is coupled to a side face of the tip end of the long side 21C of the secondary core 21 as indicated by the two-dot chain line, thereby constituting a magnetic circuit of a rectangular closed loop.

Also in this configuration, the primary unit 30 is attached so that the longitudinal direction of the primary core 31 elongates along the direction which perpendicularly intersects with the attaching direction (A), and hence the depth of a space which is required for the receiving unit A on the side the electric vehicle can be made small. Furthermore, the secondary unit 20 is disposed so as to be thin with respect to the attaching direction of the primary unit 30, and therefore the arrangement space for the whole of the device can be set to have a small depth.

In the same manner as the ninth embodiment, therefore, the degree of freedom of the design for mounting the device on the electric vehicle can be increased. Moreover, the primary core 31 slides over the secondary core 21 and then establish the opposing state of the cores. Even if there occurs an error in the insertion depth, therefore, the magnetic resistance is not rapidly increased. As a result, the embodiment can attain an effect that the influence exerted by the error of the insertion depth is very smaller than that exerted in a prior art device of the junction face opposing type in which the error of the insertion depth directly appears as an increase of the size of a gap.

Twelfth Embodiment

Figure 20:
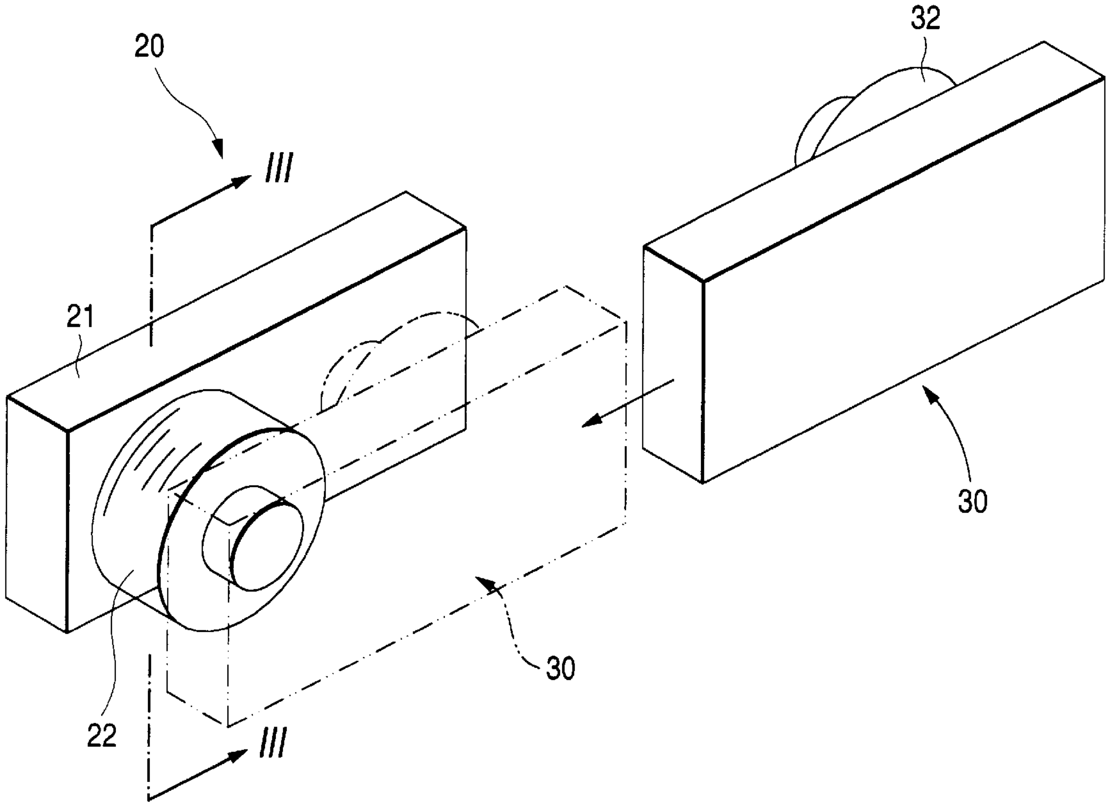
FIG. 20 is a perspective view showing a twelfth embodiment.
Figure 21:
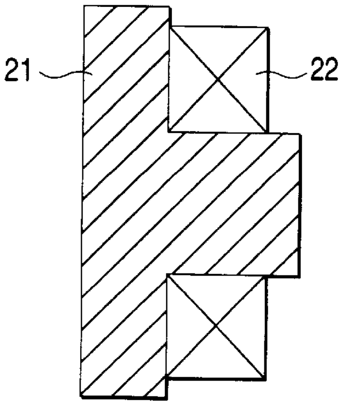
FIG. 21 is a section view taken along the line III—III of FIG. 20.

FIGS. 20 and 21 show a twelfth embodiment of the invention. The primary and secondary cores 33 and 21 are formed into an L-like shape as a whole. However, the long sides of the cores have a flat plate-like shape and the short sides have a column-like shape. The widths of the long sides having the flat plate-like shape are larger than the outer diameters of the coils 22 and 32 wound on the short sides. As shown in FIG. 21, the end faces of the coils 22 and 32 make contact with the long sides of the cores 21 and 33, respectively.

The embodiment is similar to the first embodiment in that the junction faces of the primary and secondary cores 33 and 21 are formed in the insertion direction of the primary coil unit 30, that the primary and secondary coils 32 and 22 are disposed at positions where, when the primary coil unit 30 is inserted, the coils do not interfere with each other, and that the insertion direction of the primary coil unit 30 is in parallel with the longitudinal direction of the primary coil unit.

Also in the embodiment, even if the primary coil unit 30 is positionally deviated with respect to the insertion direction, the performance of the magnetic circuit is little affected by the deviation. Furthermore, the projected area of each of the primary and secondary coil units 30 and 20 in the insertion direction can be made small. Consequently, the receiving unit 12 of the electric vehicle EV occupies a small area on the surface of the vehicle body, thereby attaining an effect that the degree of freedom of the design of the structure and appearance of the electric vehicle EV can be increased.

Since the end faces of the coils 32 and 22 are in contact with the cores 33 and 21, the transfer of heat between the coils 32, 22 and the cores 33, 21 is accelerated so that a local temperature rise is prevented from occurring. When the coils 32 and 22 are cooled, for example, also the cores 33 and 21 can be cooled. In contrast, when the cores 33 and 21 are cooled, also the coils 32 and 22 can be cooled. Since the cores 33 and 21 on which the coils 32 and 22 are wound have a column-like shape, the works of winding the coils independently from the cores and then attaching the coils to the cores can be easily conducted, and the closeness between the coils 22, 32 and the cores 21, 33 is improved.

Thirteenth Embodiment

Figure 22:
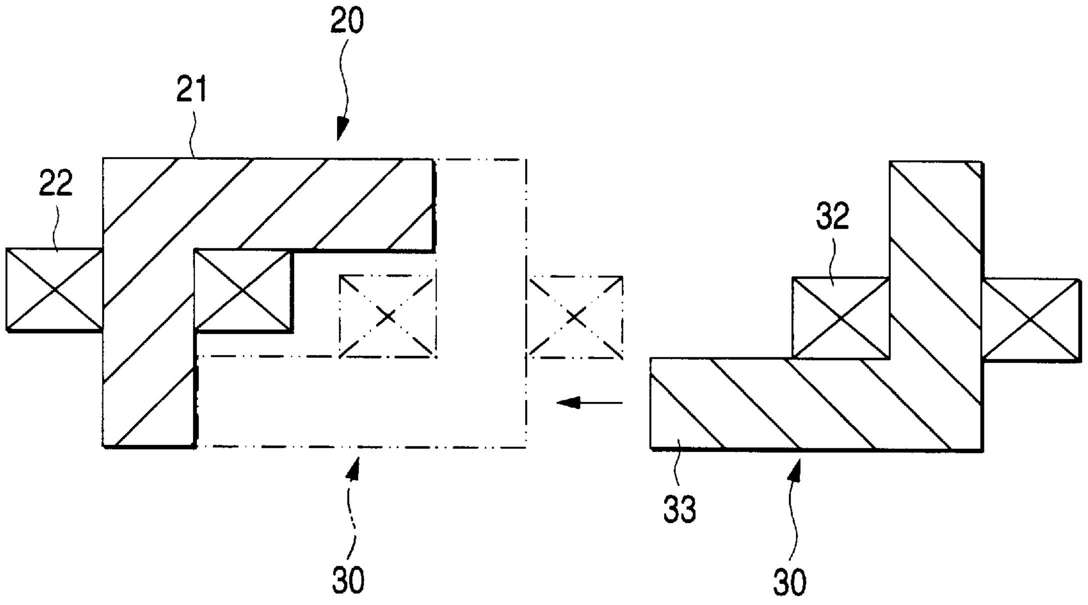
FIG. 22 is a section view of cores of a thirteenth embodiment.

FIG. 22 shows a thirteenth embodiment of the invention. The primary and secondary cores 33 and 21 have an L-like shape, and the coils 32 and 22 are wound on raised sides of the cores, respectively. According to this configuration, the primary coil unit has a shape which longitudinally elongates in the figure. The insertion direction is set so as to be parallel with the longitudinal direction of the unit (see the arrow in the figure).

Therefore, the receiving unit which is disposed on the electric vehicle EV in order to receive the primary coil unit occupies a small area on the surface of the vehicle body, and the degree of freedom of the design of the structure and appearance of the electric vehicle EV can be increased.

Fourteenth Embodiment

Figure 23:
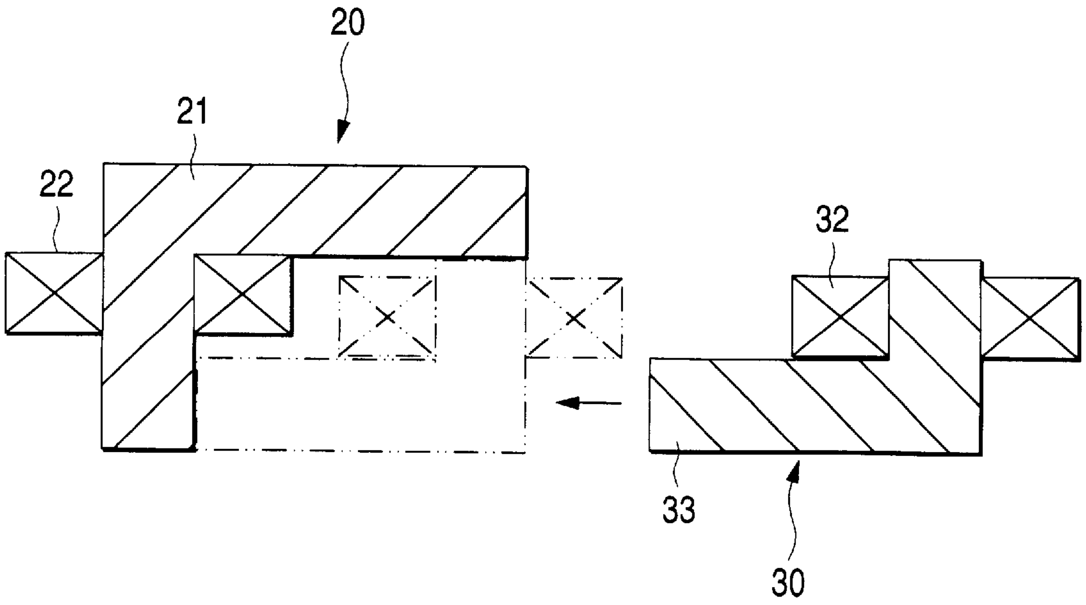
FIG. 23 is a section view of cores of a fourteenth embodiment.

FIG. 23 shows a fourteenth embodiment of the invention. The primary and secondary cores 33 and 21 have an L-like shape, and the coils 32 and 22 are wound on raised sides of the cores, respectively. The upper end face of the raised side of the primary core 33 opposes the lower face of the tip end portion of the long side of the secondary core 21. Therefore, the junction faces of the cores are formed in the insertion direction of the primary coil unit. The primary and secondary coils 32 and 22 are disposed at positions where, when the primary coil unit is inserted, the coils do not interfere with each other, and joined to each other as indicated by the two-dot chain line in the figure.

Also in this configuration, the receiving unit which is disposed on the electric vehicle EV in order to receive the primary coil unit occupies a small area on the surface of the vehicle body, and the degree of freedom of the design of the structure and appearance of the electric vehicle EV can be increased.

Fifteenth Embodiment

Figure 24:
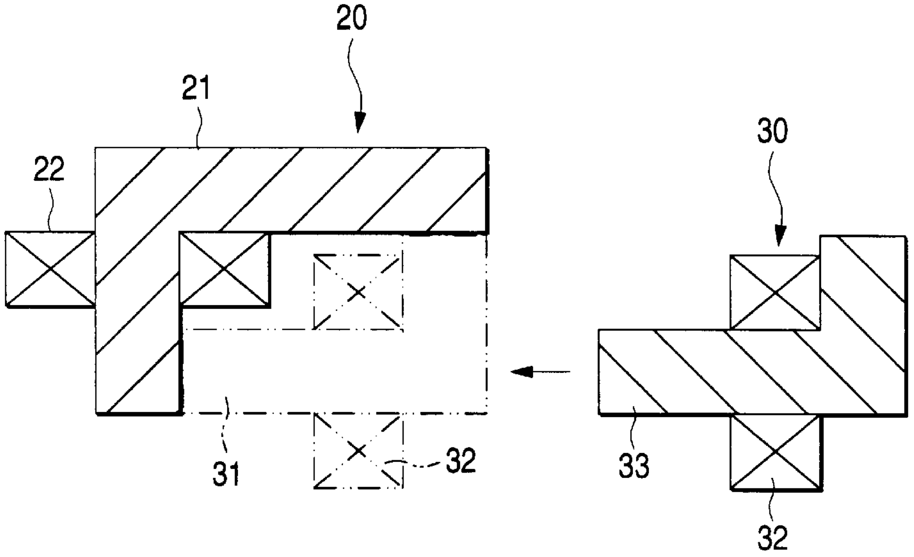
FIG. 24 is a section view of cores of a fifteenth embodiment.

FIG. 24 shows a fifteenth embodiment of the invention. The embodiment is different from the fourteenth embodiment in the direction of the primary coil 32. The direction of the primary coil 32 is turned by 90 deg. from that of the fourteenth embodiment. Namely, the primary coil 32 is wound on the long side of the L-like shape.

Also in this configuration, the receiving unit which is disposed on the electric vehicle EV in order to receive the primary coil unit occupies a small area on the surface of the vehicle body, and the degree of freedom of the design of the structure and appearance of the electric vehicle EV can be increased. Moreover, the primary coil unit can be further miniaturized.

Sixteenth Embodiment

Figure 25:
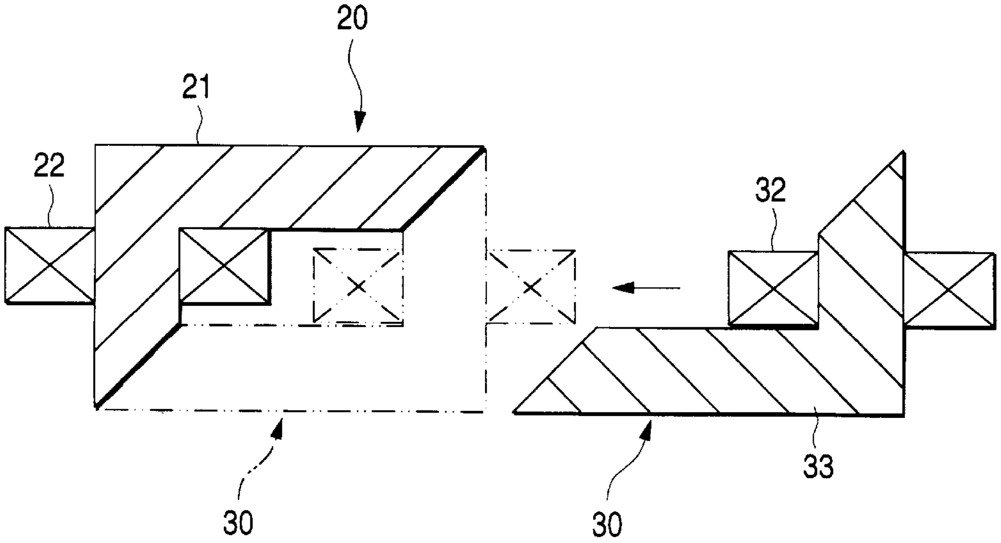
FIG. 25 is a section view of cores of a sixteenth embodiment.

FIG. 25 shows a sixteenth embodiment of the invention. The embodiment is different from the first embodiment in that the junction faces of the cores 21 and 33 are slanted at an angle of about 45 deg. with respect to the insertion direction of the primary coil unit.

Also in this configuration, the receiving unit which is disposed on the electric vehicle EV in order to receive the primary coil unit occupies a small area on the surface of the vehicle body, and the degree of freedom of the design of the structure and appearance of the electric vehicle EV can be increased. Moreover, the primary coil unit can be further miniaturized. As compared with the configuration in which junction faces constitute a butt join structure, furthermore, it is possible to reduce the influence exerted by a positional error in the insertion direction on the gap between the junction faces. The angle of each junction face to the insertion direction is not restricted to 45 deg. and may have any value.

Seventeenth Embodiment

Figure 26:
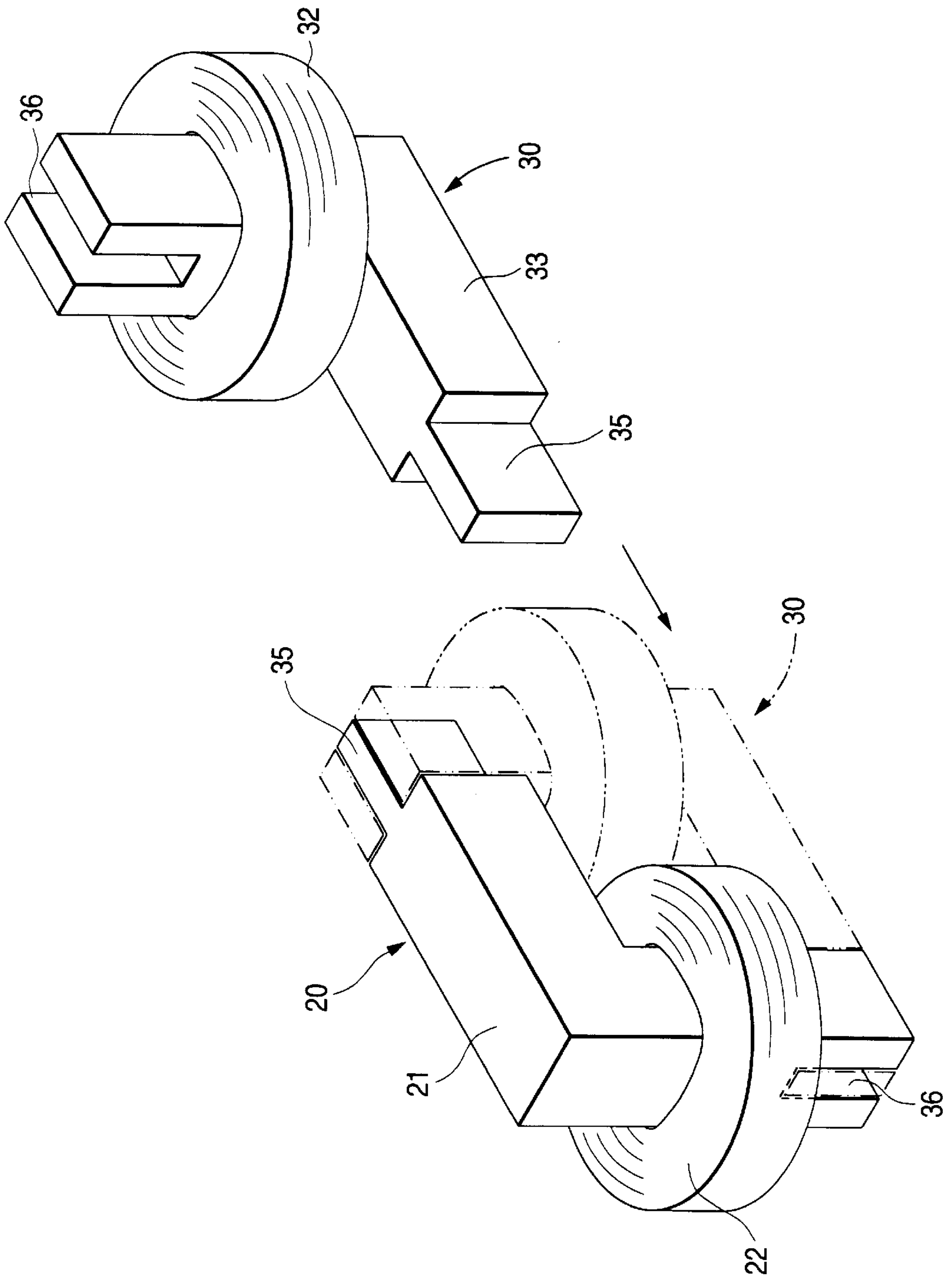
FIG. 26 is a perspective view of cores of a seventeenth embodiment.

FIG. 26 shows a seventeenth embodiment of the invention. The embodiment is different from the first embodiment in the shapes of the cores 21 and 33. In each of the cores 21 and 33, a projection plate 35 which elongates in the insertion direction of the primary coil unit is formed in one end, and a groove 36 into which the projection plate 35 of the counter core is to be inserted in the insertion direction of the primary coil unit is formed in the other end. In the primary coil unit, the projection plate 35 of the primary core 33 is disposed ahead of the other portions.

According to this configuration, the insertion of the primary coil unit causes the projection plates 35 of the cores 21 and 33 to enter the respective grooves 36, and hence the junction faces of the cores 21 and 33 are formed in the insertion direction of the primary coil unit. Since the junctions are formed as a result of the fitting of the projection plates 35 and the grooves 36, the area of each junction can be made larger.

Eighteenth Embodiment

Figure 27:
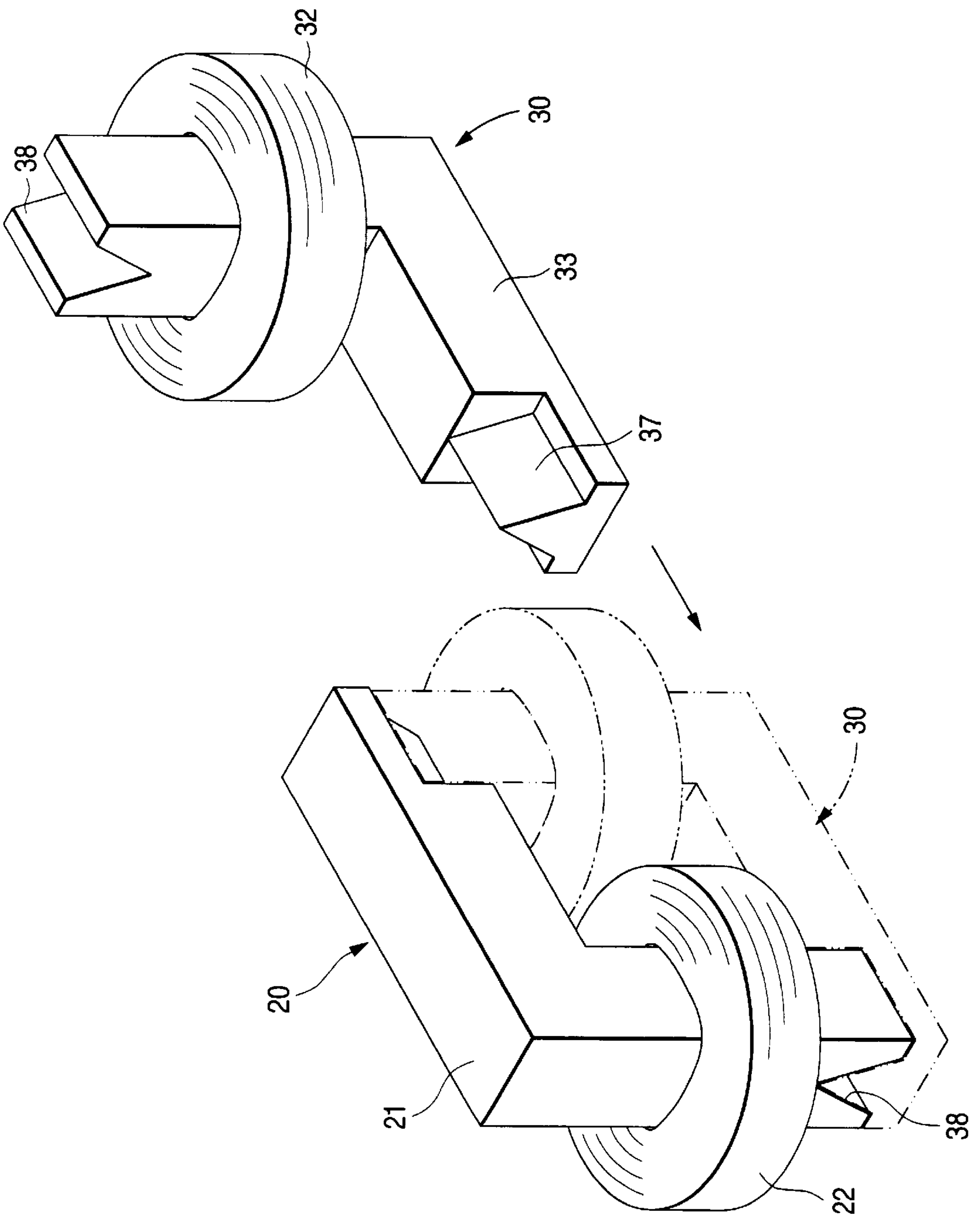
FIG. 27 is a perspective view of cores of an eighteenth embodiment.

FIG. 27 shows an eighteenth embodiment of the invention. The embodiment is different from the first embodiment in the shapes of the cores 21 and 33. In each of the cores 21 and 33, a ridge 37 which elongates in the insertion direction of the primary coil unit 30 is formed in one end, and a groove 38 into which the ridge 37 of the counter core is to be inserted in the insertion direction of the primary coil unit 30 is formed in the other end. In the primary coil unit 30, the ridge 37 of the primary core 33 is disposed ahead of the other portions.

The ridges 37 have an inclined face on each side so that a section intersecting with the elongating direction has a triangular shape. According to this configuration, when the cores 21 and 33 are urged so as to be close each other under the state where the ridges 37 are inserted into the respective grooves 38, the inclined faces cooperate so as to correctly align the cores 21 and 33. The ridges are not restricted to have a triangular section shape, and may have a semicircular section shape. Also in the alternative, the same effects described above can be attained.

Nineteenth Embodiment

Figure 28:
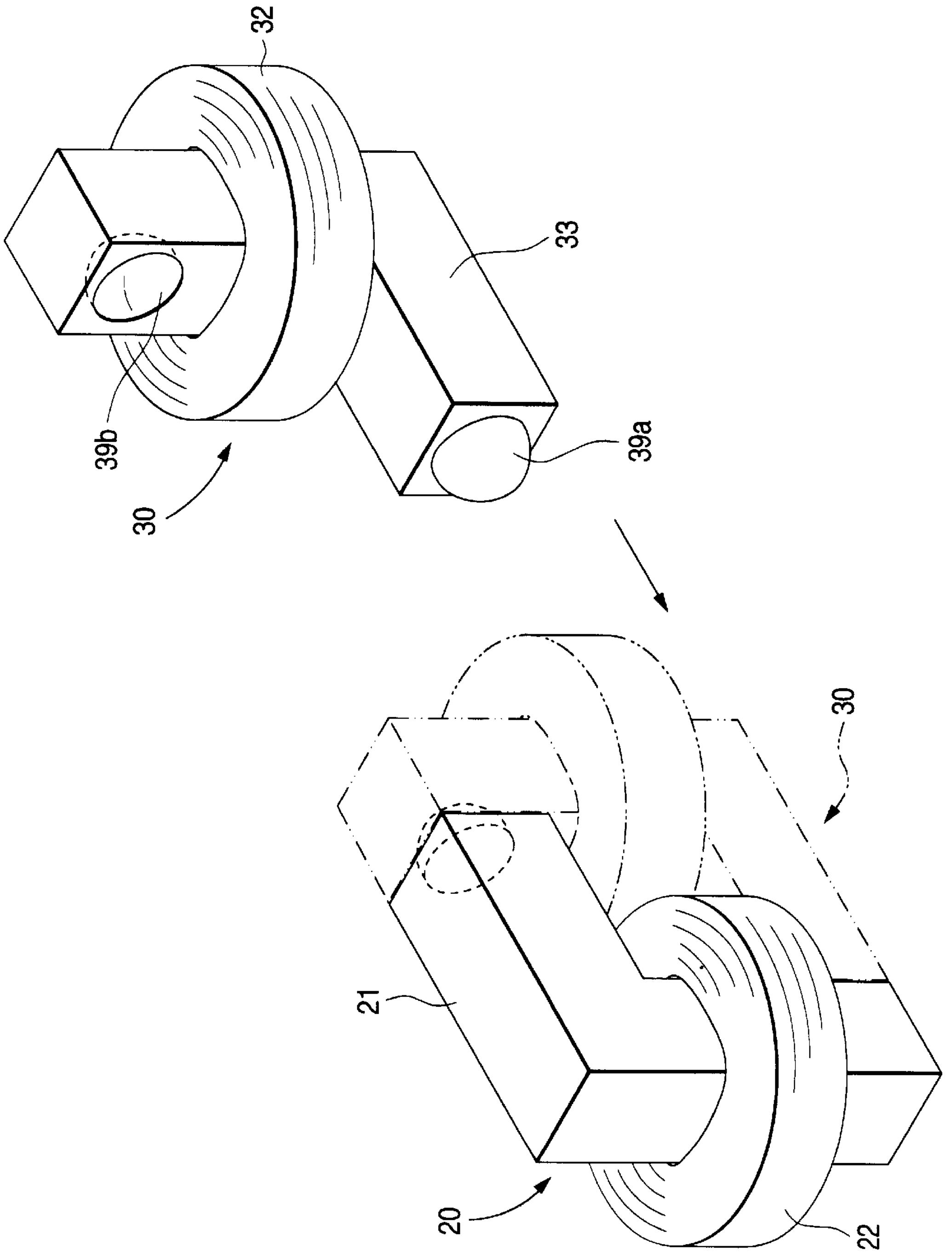
FIG. 28 is a perspective view of cores of a nineteenth embodiment.

FIG. 28 shows a nineteenth embodiment of the invention. The embodiment is different from the first embodiment in the shapes of the cores 21 and 33. In each of the cores 21 and 33, a semispherical projection 39*a* which is protruded in the insertion direction of the primary coil unit 30 is formed in one end, and a recess 39*b* into which the semispherical projection 39*a* of the counter core is to be inserted is formed in the other end.

According to this configuration, the following effect can be attained. Even if the primary and secondary coil units 30 and 20 are deviated from each other when the semispherical projection 39*a* is caused to enter the recess 39*b* by moving the primary coil unit 30 in the direction of the arrow, the deviation can be automatically corrected during the process of fitting the semispherical projection 39*a* into the recess 39*b*, thereby enabling the cores to be joined to each other with attaining positional alignment. Since the projection 39*a* has a semispherical shape, the positioning function can be surely exerted even if the primary coil unit 30 is deviated in any direction.

Twentieth Embodiment

Figure 29:
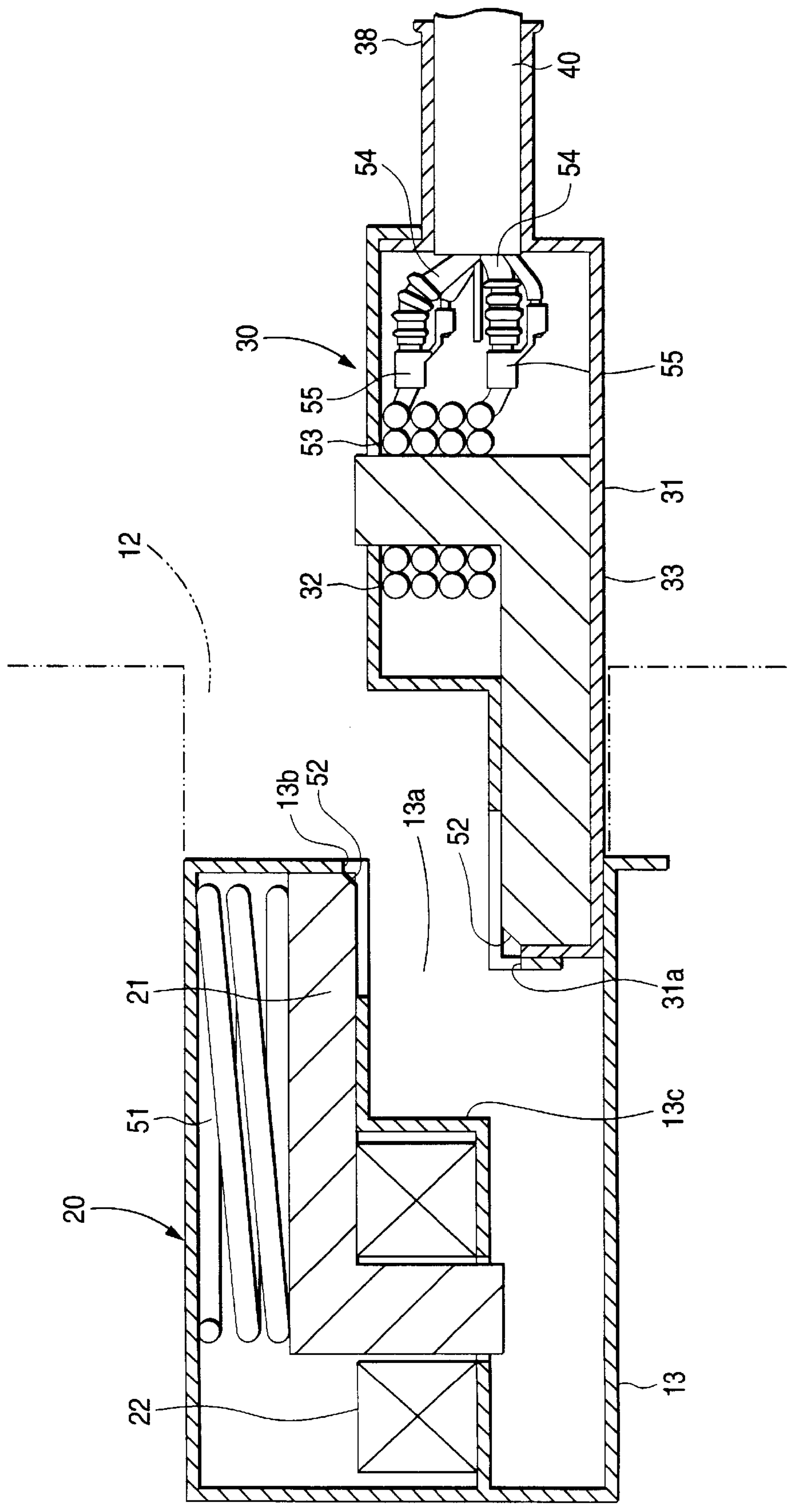
FIG. 29 is a perspective view showing primary and secondary coil units used in a twentieth embodiment of the invention.
Figure 30:
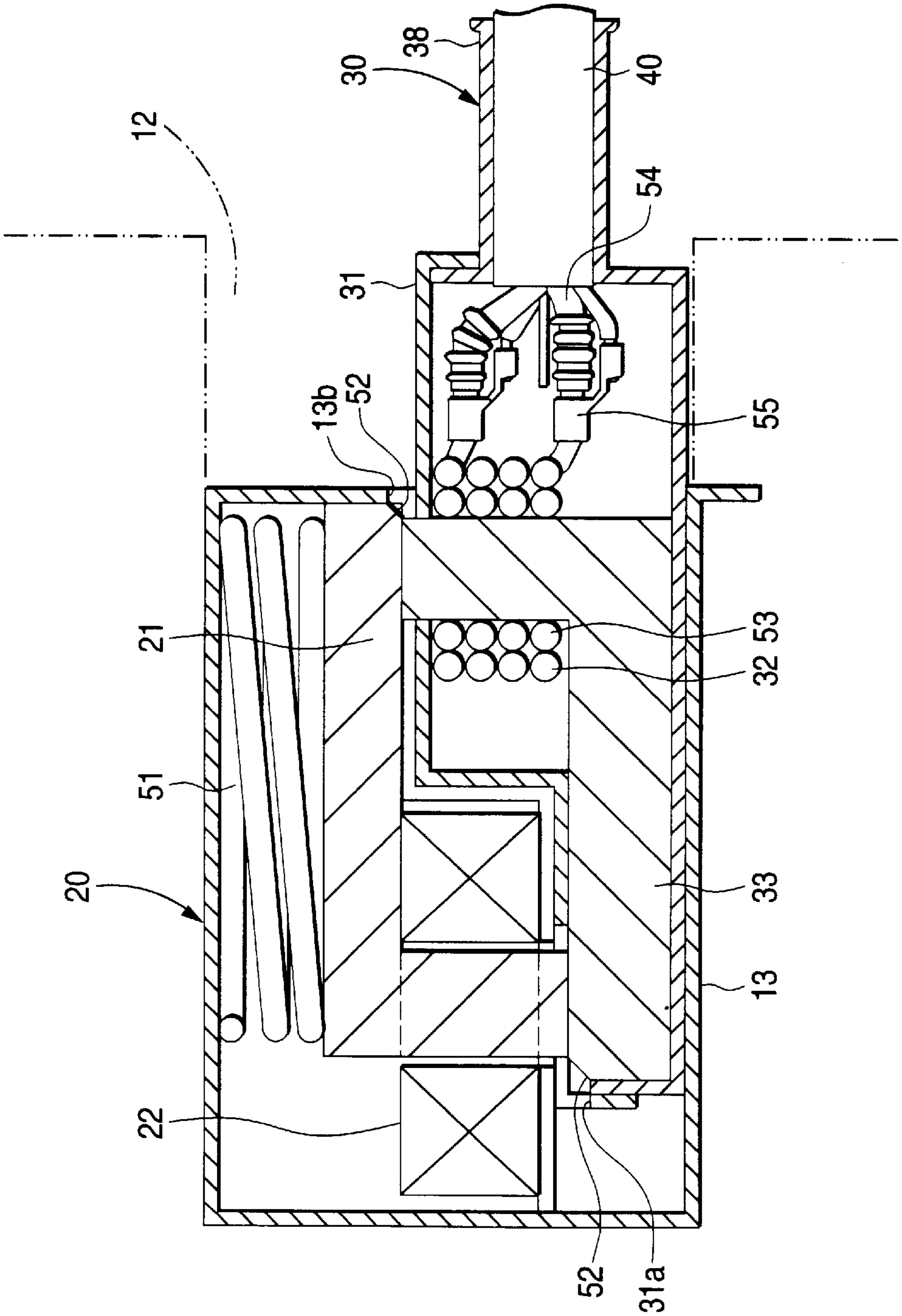
FIG. 30 is a enlarged longitudinal section view of main portion showing a function of a wiping member of the twentieth embodiment.

FIGS. 29 and 30 show a twentieth embodiment of the invention.

The first embodiment described above has a structure in which the primary core 33 is urged by the plate spring 14 in a direction along which the core is joined to the secondary core 21. In the present embodiment, the secondary core 21 is urged by a coil spring 51 in a direction along which the core is joined to the primary core 33. The other components are configured in the same manner as those of the first embodiment. Therefore, these components are designated by the same reference numerals, and the duplicated description is omitted.

In the twentieth embodiment, the secondary coil 22 is wound on the short side of the secondary core 21 which is formed into an L-like shape in the same manner as that of the first embodiment. A small gap is formed between the coil and the short side. In other words, the secondary core 21 is vertically movable with respect to the secondary coil 22. A coil spring 51 is disposed between the upper side of the secondary core 21 which is vertically movable, and the ceiling of the receiving case 13, thereby downward urging the secondary core 21. The coil spring 51 has a diameter which is slightly smaller than the length of the long side of the secondary core 21 and downward urges the whole of the long side of the secondary core 21.

In the receiving case 13, the height of the recess 13*a* at the inner side is substantially equal to the thickness of the tip end portion of the housing 31 of the primary coil unit 30, and the height in the vicinity of the inlet is substantially equal to the thickness of the base portion of the housing 31. According to this configuration, the primary coil unit 30 can be closely inserted into the recess 13*a*.

The tip end edge of the long side portion of each of the primary and secondary cores 33 and 21 is cut away into a tapered shape so as to form a guide face 52. The opposing short sides of the primary and secondary cores 33 and 21 are guided by the guide faces 52 so as to be easily joined to the upper face of the tip end portion of the primary core 33 and the lower face of the tip end portion of the secondary core 21, respectively.

The primary coil 32 wound on the primary core 33 is configured by winding a conductive pipe 53 in which the inner face is electrically insulated, in a plural number of turns. Coolant supply pipes 54 are fitted to the ends of the conductive pipe 53. Power supply terminals 55 are connected by, for example, brazing to the vicinities of the positions of the conductive pipe 53 where the pipe is connected to the coolant supply pipes 54. The core wires of the power cable for charging 40 are respectively fixed to the terminals by means of compression, thereby enabling the primary coil 32 to be excited. The two coolant supply pipes 54 elongate along the power cable for charging 40 so as to be integrated therewith. The ends of the coolant supply pipes are coupled to a circulating pump and a heat radiator which are not shown, so as to form a closed loop. When the circulating pump is operated, therefore, a coolant circulating flow is formed in which cooling water flows through the conductive pipe 53 via the incoming coolant supply pipe 54 of the power cable for charging 40, and is then returned to the circulating pump via the outgoing coolant supply pipe 54 of the power cable for charging 40, and the heat radiator. As a result, heat generated in the conductive pipe 53 is transported by the cooling water to be radiated from the heat radiator. Consequently, the primary coil 32 can be effectively cooled.

The function and effect of the thus configured embodiment are as follows:

When the primary coil unit 30 is inserted into the recess 13*a* of the receiving case 13, the short sides of the secondary and primary cores 21 and 33 abut against the guide faces 52 of the primary and secondary cores 33 and 21 during the course of the insertion, respectively. When the primary coil unit 30 is further inserted, the insertion of the primary coil unit 30 causes the short sides of the secondary and primary cores 21 and 33 to be guided by the guide faces 52 and contacted with the upper face of the tip end portion of the primary core 33 and the lower face of the tip end portion of the secondary core 21, respectively. At this time, the secondary core 21 is pushed up against the urging force of the coil spring 51. As a result, the opposing faces of the primary and secondary cores 33 and 21 are joined to each other by the resilient force exerted by the coil spring 51, thereby forming a magnetic circuit of a single closed loop (see FIG. 32). When the primary coil 32 is then excited via the power cable for charging 40, an electromotive force is generated in the secondary coil 22, with the result that the power battery of the electric vehicle EV is charged.

In this way, in the embodiment, the secondary core 21 is downward urged by the coil spring 51 as described above. Therefore, the primary and secondary cores 33 and 21 are closely contacted with each other without forming a gap, so that the magnetic resistance of the magnetic circuit is prevented from being increased, thereby suppressing the power loss. As a result, the charging efficiency can be improved. Furthermore, the coil spring 51 which has a diameter slightly smaller than the length of the long side of the secondary core 21 urges the whole of the secondary core 21. Therefore, the secondary core 21 is prevented from being urged in an inclined state, so that the cores 33 and 21 are stably joined to each other in a close contact state. Since the secondary core 21 is directly urged, the close contact state between the cores 33 and 21 can be surely realized.

Other Embodiments

The invention is not restricted to the embodiments described above with reference to the drawings. For example, also the following embodiments are included in the technical scope of the invention. In addition to the following embodiments, the invention may be executed with being variously modified and within the scope of the invention.

(1) In the embodiments described above, the opening 31*a* formed in the housing 31 of the primary coil unit 30, and the opening 13*b* of the receiving unit case 13 on the side of the electric vehicle EV remain to be opened. Alternatively, shutters which always close the respective openings except the period when the electric vehicle EV is to be charged. In the alternative, the junction faces of the cores are prevented from being contaminated with foreign substances, and hence it is possible to suppress the increase of the size of the magnetic gap of each junction.

(2) In the first to nineteenth embodiments described above, the primary and secondary coils 32 and 22 are formed by winding a usual magnet wire. When a high-frequency current is supplied to the coils 32 and 22, the skin effect occurs and the center portion of the section of each coil substantially fails to function as a current path. This phenomenon may be employed in all the embodiments. Similar to the twentieth embodiment, the coils 32 and 22 may be configured by a hollow conductive pipe and a coolant such as water or oil for cooling the coils may be passed through the pipes.

Figure 31:
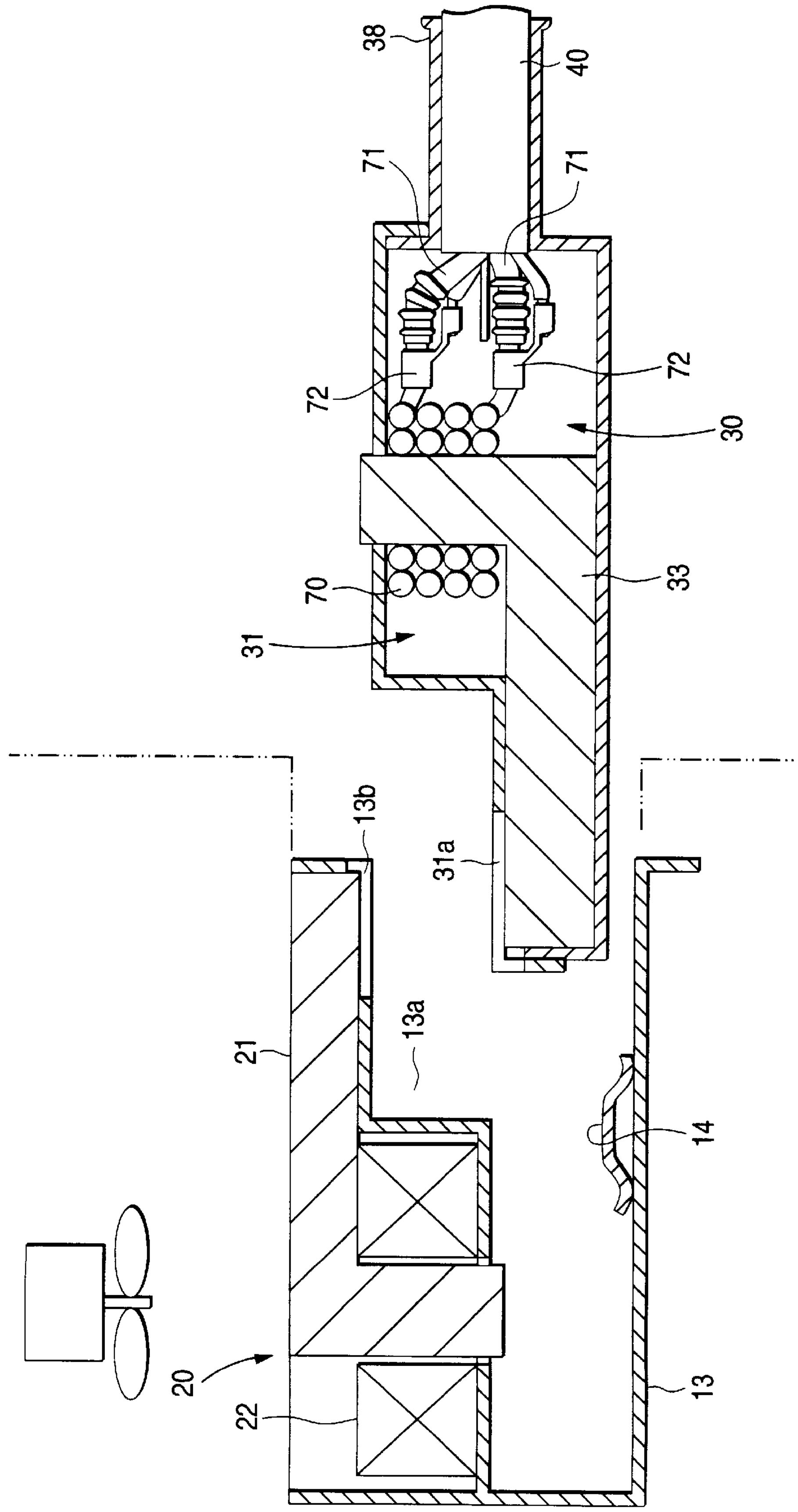
FIG. 31 is a section view showing primary and secondary coil units used in another embodiment.
Figure 32:
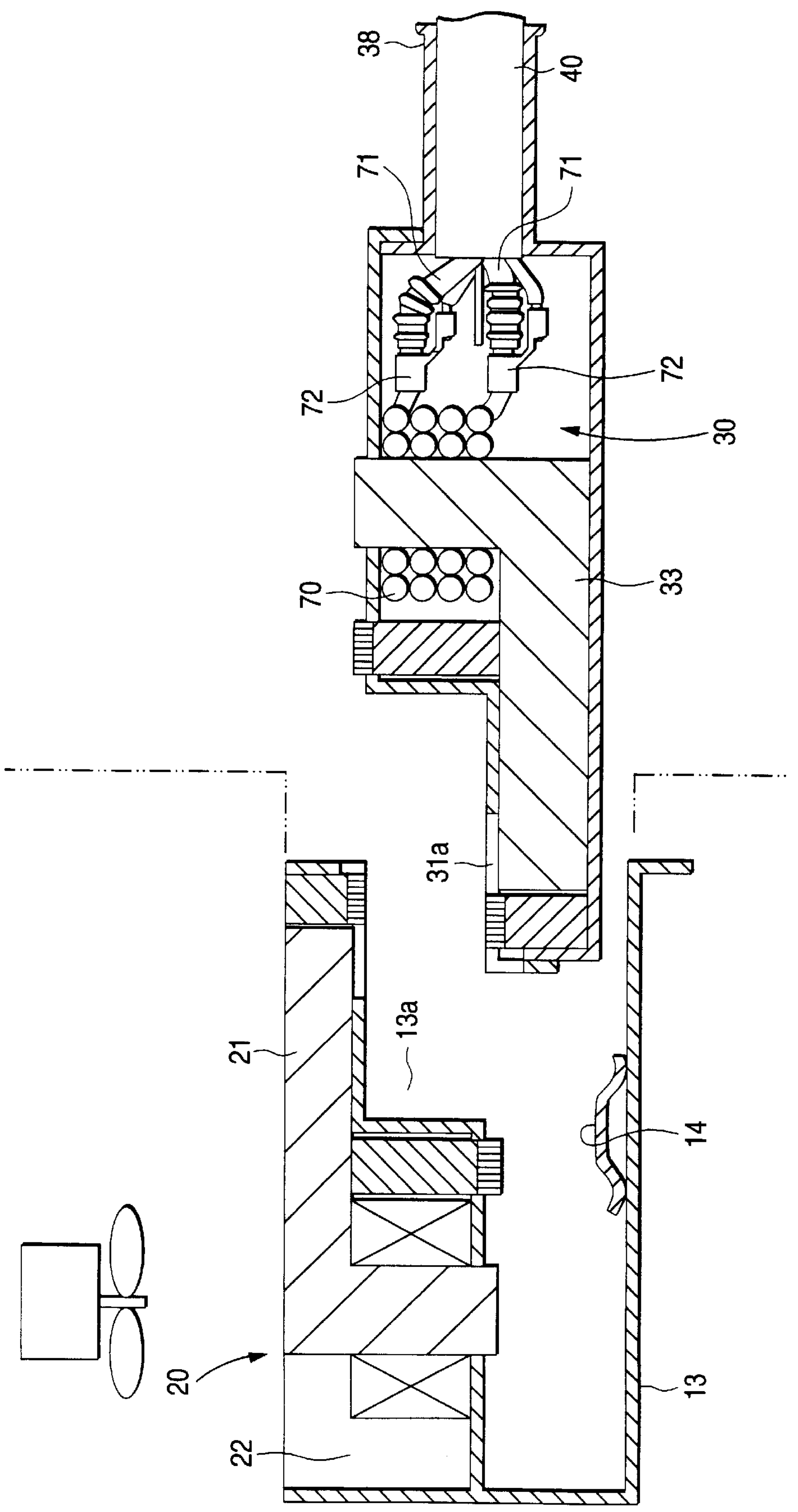
FIG. 32 is a section view showing primary and secondary coil units used in another embodiment.

Specifically, for example, the configuration shown in FIGS. 31 and 32 may be employed. In the primary coil unit 30 of the configuration, the primary coil 32 is wound on the primary core 33 in the same manner as the first and second embodiments, but the primary coil 32 is configured by winding a conductive pipe 70 in which the inner face is electrically insulated, in a plural number of turns. Coolant supply pipes 71 are fitted to the ends of the conductive pipe 70. Power supply terminals 72 are connected by, for example, brazing to the vicinities of the positions of the conductive pipe 70 where the pipe is connected to the coolant supply pipes 71. The core wires of the power cable for charging 40 are respectively fixed to the terminals by means of compression, thereby enabling the primary coil 32 to be excited. The two coolant supply pipes 71 elongate along the power cable for charging 40 so as to be integrated therewith. The ends of the coolant supply pipes are coupled to a circulating pump and a heat radiator which are not shown, so as to form a closed loop.

When the circulating pump is operated, therefore, a coolant circulating flow is formed in which cooling water flows through the conductive pipe 70 via the incoming coolant supply pipe 71 of the power cable for charging 40, and is then returned from the heat radiator to the circulating pump via the outgoing coolant supply pipe 71 of the power cable for charging 40. As a result, heat generated in the conductive pipe 70 is transported by the cooling water to be radiated from the heat radiator. Consequently, the primary coil 32 can be effectively cooled. Originally, a high-frequency current has the property that the current flows with being biased toward the outer periphery of the conductive pipe 70 by the skin effect. Even when the conductive pipe 70 is hollowed, therefore, the resistance is not increased.

Also the secondary coil 22 may be configured by a conductive pipe 70 so as to be cooled by flowing cooling water therethrough.

(3) In the second embodiment, both the primary and secondary coil units are provided with a wiping member. Alternatively, at least one of the coil units may be provided with a wiping member. For example, since, in FIG. 5, the junction faces of the core of the charging power source side are exposed to the outside, the primary unit may be only provided with a wiping member so as to wipe the secondary core disposed on the electric vehicle side. This configuration can reduce the cost of the secondary unit.

Figure 33:
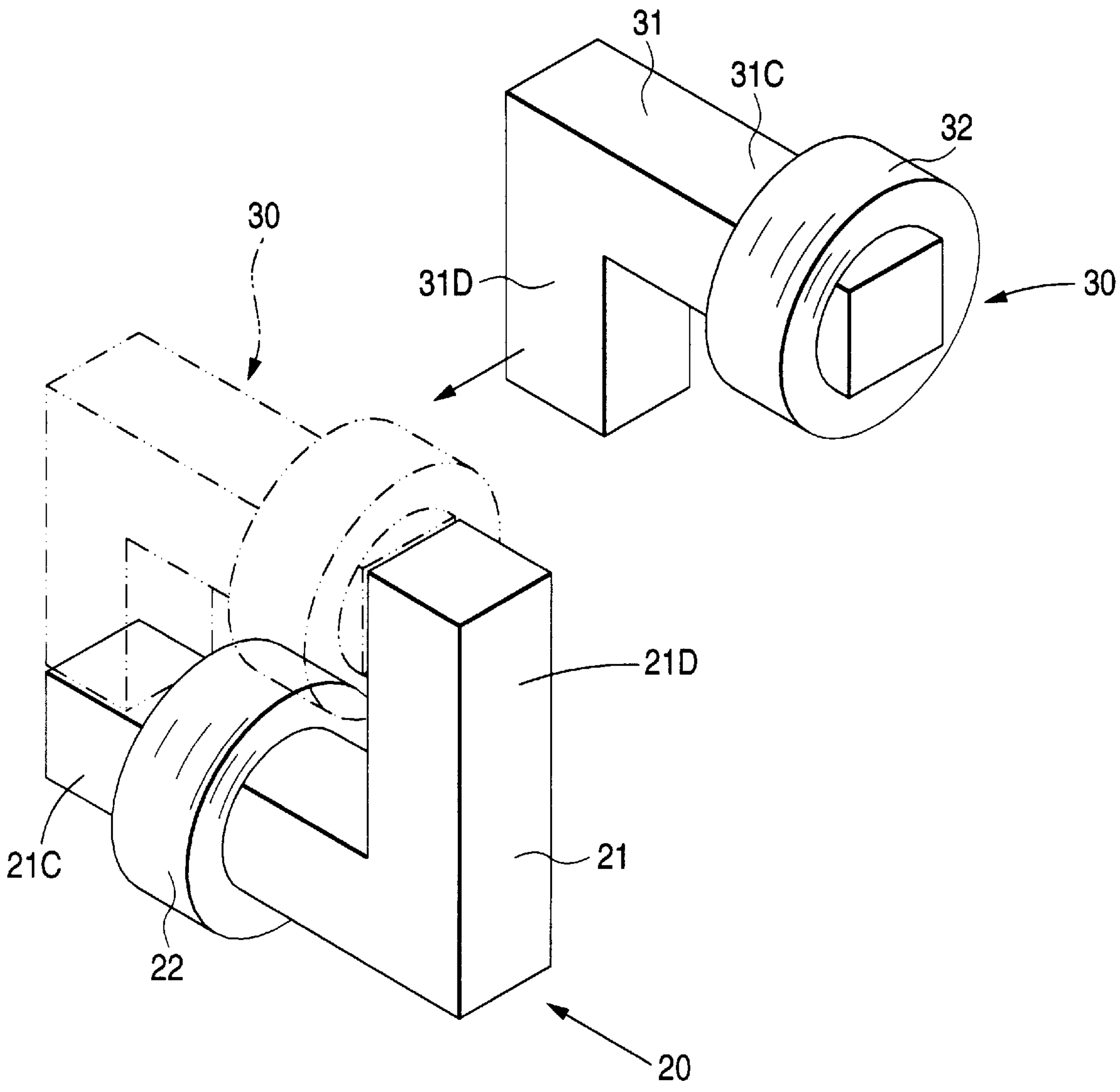
FIG. 33 is a section view showing primary and secondary coil units used in another embodiment.
Figure 34:
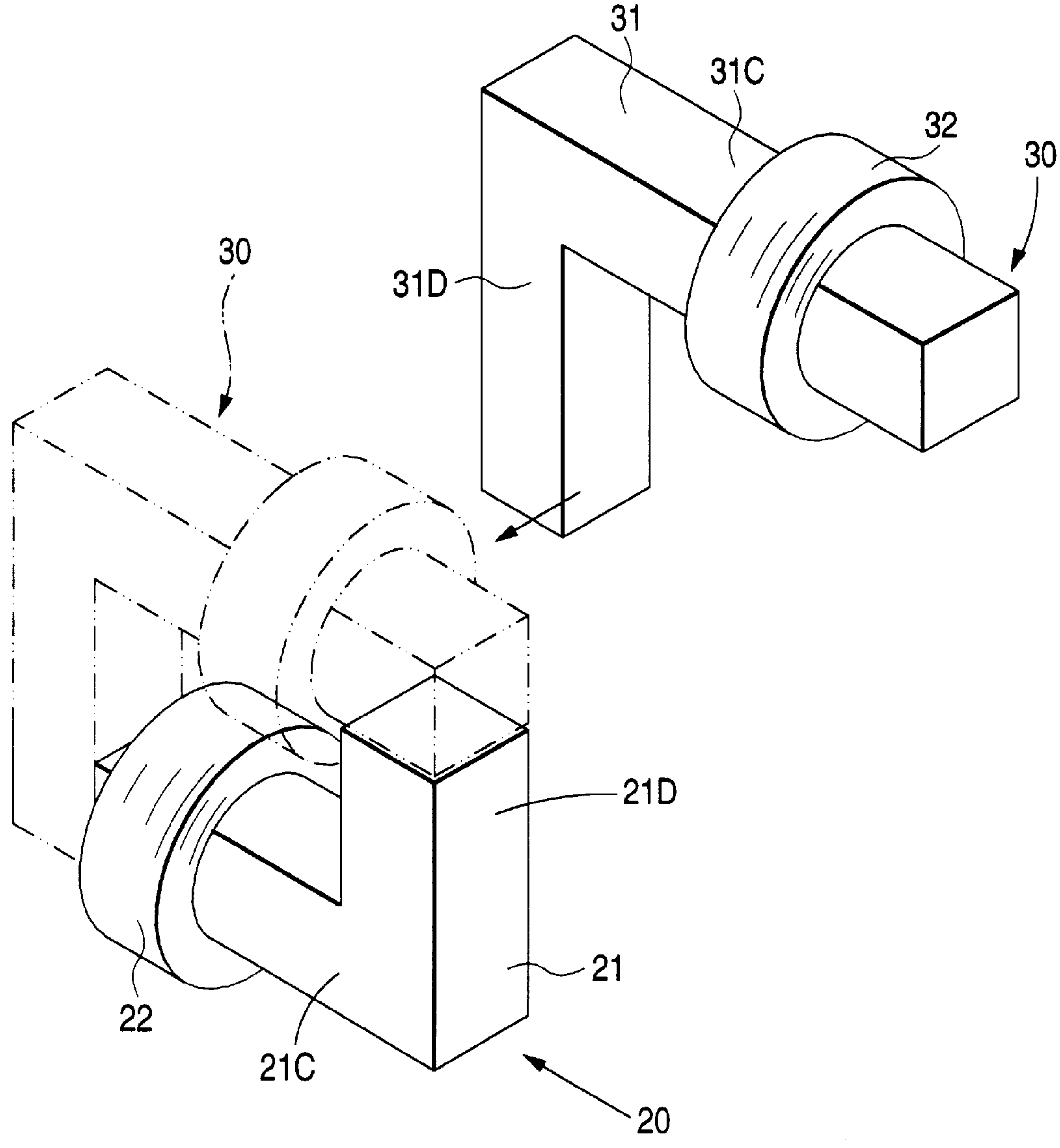
FIG. 34 is a section view showing primary and secondary coil units used in another embodiment.

(4) In the ninth to eleventh embodiments, even when the primary and secondary cores 31 and 21 have further different shapes as in other embodiments shown in FIGS. 33 and 34, it is a matter of course that the same effects as those described above can be attained.

Figure 35:
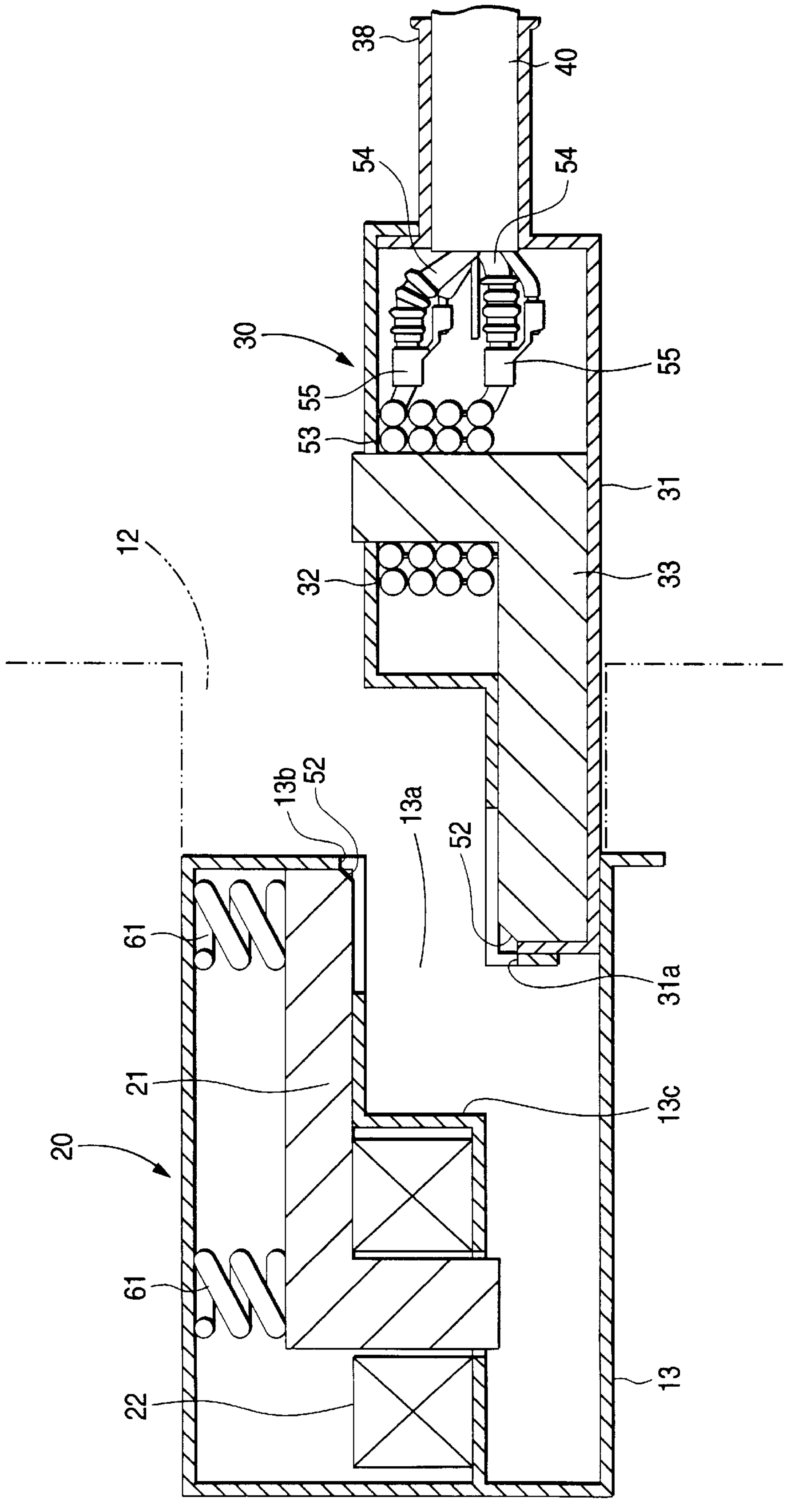
FIG. 35 is a longitudinal section view showing an another embodiment of an urging member according to the present invention.
Figure 36:
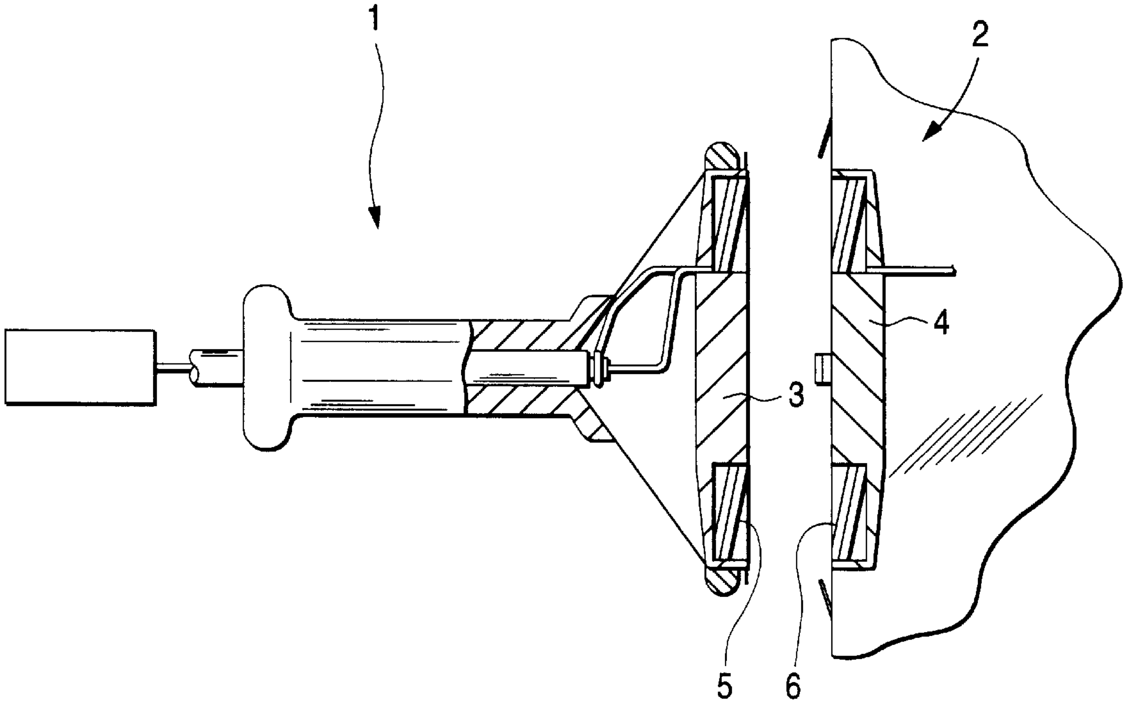
FIG. 36 is a section view showing a conventional magnetic coupling device for charging an electric vehicle.

(5) In the twentieth embodiment, the coil spring 51 is formed so as to have a diameter which is slightly smaller than the length of the long side of the secondary core 21, and the secondary core 21 is urged by the coil spring 51 which is relatively large in this way. Alternatively, as shown in FIG. 35, two small coil springs 61 may be arranged in tandem so as to downward urge the secondary core 21. In the alternative, the front, rear, left, and right portions of the secondary core 21 are uniformly downward urged. Therefore, the secondary core 21 is prevented from being urged in an inclined state, so that the cores 33 and 21 are stably joined to each other in a close contact state. In FIG. 35, the components identical with those of the twentieth embodiment are designated by the same reference numerals, and their description is omitted.

(6) In the first embodiment, the primary coil unit 30 is upward urged by the plate spring 14 disposed on the bottom of the receiving case 13. Alternatively, an urging member may be disposed on the bottom face of the primary coil unit 30 so as to stretch between the bottom face and the inner bottom portion of the receiving case 13, thereby upward urging the primary coil unit 30.

(7) In the first embodiment, the primary coil unit 30 is upward urged by the plate spring 14, whereby the primary core 33 is urged in a direction along which the core is joined to the secondary core 21. Alternatively, an urging member which directly upward urges the primary core 33 may be disposed in the housing 31 of the primary coil unit 30.

(8) A combination of the structures of the first and twentieth embodiments in which the primary coil unit 30 is upward urged by the plate spring 14 and the secondary core 21 is downward urged by the coil spring 51 may be employed.

(9) In the twentieth embodiment, the secondary core 21 is urged toward the primary core 33. By contrast, the primary coil 32 may be fixed to the interior of the housing 31 and the primary core 33 may be urged toward the secondary core 21. Alternatively, both the cores 33 and 21 may be urged.

(10) The urging member of the invention is configured as the plate spring 14 in the first embodiment, and as the coil spring 51 in the twentieth embodiment. Alternatively, the urging member may be an elastic body such rubber, sponge, or a rubber bag into which a gas is filled.

(11) In the embodiments described above, the receiving unit A on the side of the electric vehicle is diagrammatically shown and remains to be opened. Alternatively, a shutter which closes the opening except the period when the electric vehicle is to be charged may be disposed. In the alternative, the junction faces of the core are prevented from being contaminated with foreign substances, and hence it is possible to suppress the increase of the size of the magnetic gap of each junction.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. A magnetic coupling device for charging an electric vehicle comprising:

a primary coil unit having a primary core and a primary coil wound on said primary core, said primary coil unit disposed on a charging power source side; and a secondary coil unit having a secondary core and a secondary coil wound on said secondary core, said primary and secondary cores being spaced apart a predetermined lateral distance, said secondary coil unit disposed on the electric vehicle, wherein said primary coil unit is inserted a predetermined longitudinal insertion distance into the electric vehicle and said primary and secondary cores are coupled in a coupling state so that said primary and secondary cores constitute a closed loop-like magnetic circuit, and wherein each of said primary and secondary cores has a junction face which faces each other under the coupling state, and said junction faces of said primary and secondary cores face each other in a plane that is parallel to an insertion direction of said primary coil unit such that the predetermined lateral distance between the primary and secondary cores is substantially independent of the predetermined longitudinal insertion distance of the primary coil unit, wherein the insertion direction of said primary coil unit is parallel to a longitudinal direction of said primary coil unit.

2. A magnetic coupling device for charging an electric vehicle comprising:

a primary coil unit having a primary core and a primary coil wound on said primary core, said primary coil unit disposed on a charging power source side; and a secondary coil unit having a secondary core and a secondary coil wound on said secondary core, said secondary coil unit disposed on the electric vehicle, said secondary core forming a substantially planar interface with the primary core, wherein said primary coil unit is inserted into the electric vehicle and said primary and secondary cores are coupled so that said primary and secondary cores constitute a closed loop-like magnetic circuit, wherein an insertion direction of said primary coil unit is substantially parallel to the interface between the primary and secondary cores and wherein said primary core comprises a leg portion which elongates in the insertion direction of said primary coil unit and a connecting portion which is continuous with said leg portion is formed to be larger than said connecting portion.

3. A magnetic coupling device for charging an electric vehicle according to claim 2, wherein said primary coil is wound on said connecting portion to be a flat shape in a section taken along the insertion direction of said primary coil unit, whereby making smaller the projected area of said primary coil unit in the insertion direction.

4. A magnetic coupling device for charging an electric vehicle according to claim 2, wherein said primary coil is wound on said leg portion of said primary core in the form of a single layer, whereby making smaller the projected area of said primary coil unit in the insertion direction.

5. A magnetic coupling device for charging an electric vehicle comprising:

a primary coil unit having a primary core and a primary coil wound on said primary core, said primary coil unit disposed on a charging power source side; and a secondary coil unit having a secondary core and a secondary coil wound on said secondary core, said secondary coil unit disposed on the electric vehicle, wherein said primary coil unit is inserted into the electric vehicle and said primary and secondary cores are coupled so that said primary and secondary cores constitute a closed loop-like magnetic circuit, and wherein each of said primary and secondary cores has a junction face which contacts each other under the coupling state and at least one of said primary and secondary coil units is provided with a wiping member which, when said primary coil unit is inserted, wipes said junction face of a counter core.

6. A magnetic coupling device for charging an electric vehicle according to claim 5, wherein said wiping member is disposed at a position where, before the cores are coupled to each other, the wiping member wipes said junction face of said counter core.

7. A magnetic coupling device for charging an electric vehicle comprising:

a primary coil unit having a primary core and a primary coil wound on said primary core, said primary coil unit disposed on a charging power source side; and a secondary coil unit having a secondary core and a secondary coil wound on said secondary core, said secondary coil unit disposed on the electric vehicle, wherein said primary coil unit is inserted into the electric vehicle and said primary and secondary cores are coupled so that said primary and secondary cores constitute a closed loop-like magnetic circuit, and wherein said device further comprises an urging member which, under the coupling state, urges at least one of said primary and secondary cores in a direction along which said cores are coupled to each other.

8. A magnetic coupling device for charging an electric vehicle according to claim 7, wherein said urging member is disposed in a receiving case into which said primary coil unit is inserted, and urges said primary coil unit in a direction along which said primary and secondary cores are coupled to each other.

9. A magnetic coupling device for charging an electric vehicle according to claim 7, wherein, in at least one of said primary and secondary coil units, said core is provided to be displaceable with respect to said coil by means of the urging member, and under the coupling state, said core is urged in a direction along which said core is coupled to said core of a counter unit while said coil is fixed.

* * * * *